US012130585B2

(12) United States Patent
Shimano et al.

(10) Patent No.: US 12,130,585 B2
(45) Date of Patent: Oct. 29, 2024

(54) ELECTROPHOTOGRAPHIC DEVELOPER SET COMPRISING TONER AND POWDER ADHESIVE, METHOD FOR PRODUCING BONDED PRODUCT, AND POWDER ADHESIVE

(71) Applicant: CANON KABUSHIKI KAISHA, Tokyo (JP)

(72) Inventors: Tsutomu Shimano, Shizuoka (JP); Koji Nishikawa, Shizuoka (JP); Yuhei Terui, Shizuoka (JP); Shohei Yamashita, Tokyo (JP); Kohei Matsuda, Kanagawa (JP); Yuki Nishizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 643 days.

(21) Appl. No.: 17/385,147

(22) Filed: Jul. 26, 2021

(65) Prior Publication Data

US 2022/0035261 A1 Feb. 3, 2022

(30) Foreign Application Priority Data

Jul. 31, 2020 (JP) ................................ 2020-130345

(51) Int. Cl.

| | |
|---|---|
| ***G03G 9/097*** | (2006.01) |
| ***G03G 9/08*** | (2006.01) |
| ***G03G 9/087*** | (2006.01) |
| ***G03G 9/13*** | (2006.01) |
| ***G03G 9/135*** | (2006.01) |

(52) U.S. Cl.
CPC ....... *G03G 9/08711* (2013.01); *G03G 9/0823* (2013.01); *G03G 9/08782* (2013.01); *G03G 9/131* (2013.01); *G03G 9/135* (2013.01)

(58) Field of Classification Search
CPC ......................... G03G 9/0825; G03G 9/08782
See application file for complete search history.

(56) References Cited

U.S. PATENT DOCUMENTS 7,260,354 B2 8/2007 Ishida
9,377,705 B2 6/2016 Shimano et al.
(Continued)

FOREIGN PATENT DOCUMENTS

JP 2006-171607 A 6/2006
JP 2008-170659 A 7/2008
JP 2019-167471 A 10/2019

OTHER PUBLICATIONS

U.S. Appl. No. 17/385,127, filed Jul. 26, 2021, Nishikawa et al.
U.S. Appl. No. 17/385,137, filed Jul. 26, 2021, Yamashita et al.
U.S. Appl. No. 17/385,118, filed Jul. 26, 2021, Terui et al.

*Primary Examiner* — Peter L Vajda
(74) *Attorney, Agent, or Firm* — Venable LLP

(57) ABSTRACT

An electrophotographic developer set comprising a toner comprising a thermoplastic resin and a wax, and a powder adhesive comprising a thermoplastic resin and a wax, wherein where Ea (mmol/g) denotes an ester group concentration of the wax contained in the toner, Na (mass %) denotes a content of the wax in the toner, Eb (mmol/g) denotes an ester group concentration of the wax contained in the powder adhesive, and Nb (mass %) denotes a content of the wax in the powder adhesive, the Ea, the Na, the Eb and the Nb satisfy the following formulae: $0.00 \leq Ea \leq 2.45$, $2.50 \leq Eb \leq 3.60$, and $0.80 \leq Nb/Na$.

12 Claims, 10 Drawing Sheets

(56) References Cited

U.S. PATENT DOCUMENTS

| | | | |
|---|---|---|---|
| 9,857,711 B2 | 1/2018 | Yoshida et al. | |
| 10,416,582 B2 | 9/2019 | Nakagawa et al. | |
| 10,437,165 B2 | 10/2019 | Shimano et al. | |
| 10,877,390 B2 | 12/2020 | Shimano et al. | |
| 10,982,117 B2 | 4/2021 | Yamasaki et al. | |
| 2016/0246197 A1* | 8/2016 | Matsushita | G03G 9/09791 |
| 2020/0183294 A1 | 6/2020 | Fukudome et al. | |
| 2022/0035264 A1* | 2/2022 | Yamashita | G03G 9/113 |

* cited by examiner

ELECTROPHOTOGRAPHIC DEVELOPER SET COMPRISING TONER AND POWDER ADHESIVE, METHOD FOR PRODUCING BONDED PRODUCT, AND POWDER ADHESIVE

BACKGROUND OF THE INVENTION

Field of the Invention

The present disclosure relates to an electrophotographic developer set comprising a toner and a powder adhesive functioning as an adhesive, and with which an electrostatic latent image is developed on a recording material by using an electrophotographic system to form a toner image and an adhesive portion by the powder adhesive, and the powder adhesive. The present disclosure also relates to a method for producing a bonded product by using the above electrophotographic developer set.

Description of the Related Art

Conventionally, when making a paper bag on which different information is printed for each individual with a printer or a copier, a method of setting a pre-made paper bag in the printer or copier and printing on the paper bag has been used. The resulting problem arising when performing printing on a paper bag and on plain paper at the same time is that it takes time and effort to change the paper used in the printer from the paper bag to plain paper every time the print target is changed, or printing is performed on a wrong print target.

To address the above problems, a method has been proposed in which, in addition to image formation with toner by using an electrophotographic system, an adhesive portion derived from a pigment-free powder adhesive is also formed for paper bonding. A further method has been proposed in which printing on plain paper in accordance with the above method is simultaneously accompanied by processing of the plain paper into a paper bag. A toner set of a toner and a powder adhesive used in the method has been proposed.

Japanese Patent Application Publication No. 2006-171607 proposes an image forming method for forming an image and an adhesive portion by using an adhesive toner such that a lower limit temperature of an appropriate fixing temperature of the adhesive toner is lower than that of a toner used for image formation.

Japanese Patent Application Publication No. 2008-170659 proposes a powder adhesive for an electrophotographic system, wherein this powder adhesive having a cyclic polyolefin resin as a basic structure.

Japanese Patent Application Publication No. 2019-167471 proposes an adhesive material for an electrophotographic system, wherein this material using a styrene resin and a (meth)acrylate ester resin.

SUMMARY OF THE INVENTION

In the method described in Japanese Patent Application Publication No. 2006-171607, it is disclosed that by using an adhesive toner that a lower limit temperature of an appropriate fixing temperature of the adhesive toner is lower than that of a toner used for image formation, it is possible to melt the adhesive toner at a temperature at which the toner used for image formation is not melted.

However, strong adhesive strength may fail to be obtained in a case where a paper bag is produced, in accordance with the above method, by forming a toner image portion of toner and an adhesive portion of a powder adhesive on the paper, followed by overlaying of paper, with the toner image portion and the adhesive portion facing inward, and by melting of the adhesive portion. It has been further found that in a case where the adhesive portion is sufficiently melted by heating in order to obtain strong adhesive strength, a phenomenon (print transfer) may occur in that the image portion melts, whereupon part of the image portion is transferred to the paper opposite, hence it is difficult to achieve both print transfer and strong adhesive strength.

The powder adhesives disclosed in Japanese Patent Application Publication Nos. 2008-170659 and 2019-167471 are used in applications that involve stripping of the adhesive portion, and accordingly do not afford an adhesive strength strong enough to allow producing a paper bag.

The present disclosure provides an electrophotographic developer set comprising a toner and a powder adhesive, with which print transfer is unlikely and strong adhesive strength can be obtained, and a method for producing a bonded product using the electrophotographic developer set.

An electrophotographic developer set comprising a toner comprising a thermoplastic resin and a wax, and a powder adhesive comprising a thermoplastic resin and a wax, wherein where Ea (mmol/g) denotes an ester group concentration of the wax contained in the toner, Na (mass %) denotes a content of the wax in the toner, Eb (mmol/g) denotes an ester group concentration of the wax contained in the powder adhesive, and Nb (mass %) denotes a content of the wax in the powder adhesive, the Ea, the Na, the Eb and the Nb satisfy the following formulae:

$$0.00 \leq Ea \leq 2.45,$$

$$2.50 \leq Eb \leq 3.60, \text{ and}$$

$$0.80 \leq Nb/Na.$$

The present disclosure succeeds thus in providing an electrophotographic developer set comprising a toner and a powder adhesive, in which print transfer is unlikely, and which boasts strong adhesive strength, and a method for producing a bonded product using the electrophotographic developer set. Further features of the present invention will become apparent from the following description of exemplary embodiments with reference to the attached drawings.

DESCRIPTION OF THE EMBODIMENTS

Figure 1:
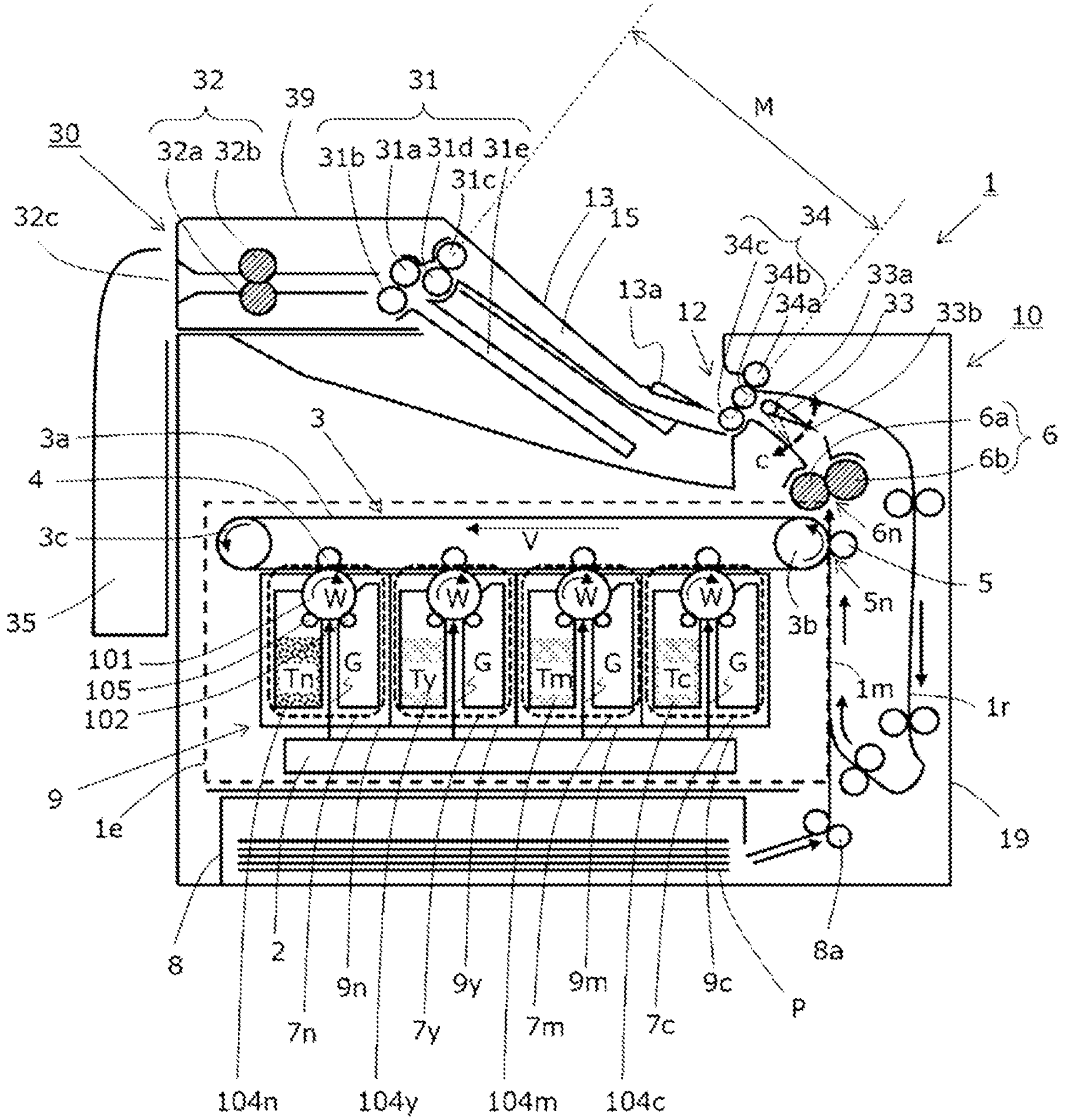
FIG. 1 is a schematic drawing of an image forming apparatus.

In the present disclosure, the notations "from XX to YY" and "XX to YY" representing a numerical range denote, unless otherwise stated, a numerical value range that includes the lower limit and the upper limit thereof, as endpoints.

In a case where numerical value ranges are described in stages, the upper limits and the lower limits of the respective numerical value ranges can be combined arbitrarily.

Further, methods for measuring physical properties will be described hereinbelow.

First, an example of a method for producing a paper bag by an electrophotographic system using an electrophotographic developer set comprising the above toner and powder adhesive will be described hereinbelow.

Initially, a toner image portion of toner and an adhesive portion made of powder adhesive are formed on the paper (forming step) using an electrophotographic system. To produce then a paper bag, the whole is heated to thereby fix (fixing step) the toner image portion and the adhesive portion on the paper, and then paper is overlaid so as to sandwich the adhesive portion, with further heating to melt the adhesive portion and thereby elicit bonding (bonding step). The paper overlaying method may involve folding of the paper or laying of a different piece of paper.

The inventors found that lowering adhesiveness between the toner and paper is important in order to prevent print transfer of an toner image portion in the bonding step. On the other hand, enhancing adhesiveness between the powder adhesive and paper is important in order to achieve strong adhesive strength. The inventors conducted diligent studies aimed at overcoming the above tradeoff in performance.

The present disclosure relates an electrophotographic developer set comprising a toner comprising a thermoplastic resin and a wax, and a powder adhesive comprising a thermoplastic resin and a wax, wherein where Ea (mmol/g) denotes an ester group concentration of the wax contained in the toner, Na (mass %) denotes a content of the wax in the toner, Eb (mmol/g) denotes an ester group concentration of the wax contained in the powder adhesive, and Nb (mass %) denotes a content of the wax in the powder adhesive, the Ea, the Na, the Eb and the Nb satisfy the following formulae:

$$0.00 \leq Ea \leq 2.45,$$

$$2.50 \leq Eb \leq 3.60, \text{ and}$$

$$0.80 \leq Nb/Na.$$

Print transfer suppression and strong adhesiveness could both be achieved by controlling the physical properties of the developer set so as to lie in the above ranges. Concerning the underlying reasons for this, the inventors focused on interactions between ester groups in the waxes contained in the toner and the powder adhesive, and hydroxyl groups in cellulose which is the main material of paper, and conjectured the following.

Multiple hydroxyl groups are present on the surface of cellulose, the hydroxyl groups being bonded to each other by hydrogen bonds, to thereby form paper as a result. Accordingly, the affinity between the powder adhesive and cellulose increases when the powder adhesive contains a large amount of ester groups capable of forming hydrogen bonds with hydroxyl groups. Thanks to this increase in affinity, wettability between the powder adhesive and cellulose improves, and the rate at which the powder adhesive permeates into the paper increases. Adhesiveness between the powder adhesive and the paper is improved as a result.

Waxes exhibit low viscosity when melted and accordingly the rate of wax permeation into the paper is likely to be improved when a large amount of ester groups is introduced into the wax. Therefore, in a case where a wax having a large amount of ester groups introduced therein is added to a powder adhesive, the wax permeates rapidly into the paper and, along with this, the totality of the powder adhesive permeates likewise into the paper; this results in greatly improved adhesiveness between the powder adhesive and paper.

On the other hand, waxes generally have low polarity and low affinity towards polar groups such as hydroxyl groups. Therefore, adding to a toner, or to a powder adhesive, a wax having a small amount of ester groups introduced thereinto results rather in hindered permeation of the toner or powder adhesive into the paper, and in lowered adhesiveness with paper.

In view of the above considerations, where Ea (mmol/g) denotes an ester group concentration of the wax contained in the toner, it is necessary that Ea lies in the range from 0.00 to 2.45 to lower the ester group concentration of the wax contained in the toner. Adhesiveness between the toner and paper can be reduced, and accordingly the occurrence of print transfer become less likely, by prescribing Ea to be 2.45 or lower.

Further, where Eb (mmol/g) denotes an ester group concentration of wax contained in the powder adhesive, it is necessary that Eb is 2.50 or higher to increase the ester group concentration of wax contained in the powder adhesive. By setting Eb to be 2.50 or higher, the adhesiveness between the powder adhesive and paper can be increased, and strong adhesive strength is obtained as a result. By setting Eb to be 3.60 or lower, it becomes possible to prevent excessive permeation of the powder adhesive into the paper, so that strong adhesive strength can be obtained as a result.

More preferably, Ea is from 0.00 to 1.95, and Eb is from 2.60 to 3.40.

To achieve both print transfer suppression and strong adhesive strength, where Na (mass %) denotes content of wax in the toner and Nb (mass %) denotes content of wax in the powder adhesive, it is necessary that a wax amount ratio Nb/Na is 0.80 or higher.

Setting herein Nb/Na is to be 0.80 or higher signifies that the amount of wax contained in the powder adhesive is larger than the amount of wax contained in the toner, or is not too small an amount. Hence, the endothermic quantity of the toner can be made smaller than the endothermic quantity of the powder adhesive. Therefore, the heat imparted by the fixing unit in the bonding step is robbed less readily during melting of the toner, and melting of the powder adhesive is less likely to be hindered.

The powder adhesive and paper can be bonded firmly as a result. When Nb/Na is increased, heat is robbed during melting of the powder adhesive, which hinders as a result melting of the toner; in consequence, adhesiveness between the toner and paper is lower, and print transfer suppression and strong adhesive strength can thus be combined.

Nb/Na is preferably from 1.00 to 6.00, more preferably from 1.10 to 2.50.

A compound having a molecular weight of 3000 or less and an endothermic peak of 80 J/g or more as measured by differential scanning calorimetry (DSC) is defined as a wax in the present disclosure.

Preferably, Ea and Eb satisfy $$0.50 \leq Eb-Ea \leq 3.40.$$

The larger the difference between the Ea and the Eb, the higher is the level at which there can be achieved both the effect of lowering adhesiveness between the toner and paper, and the effect of increasing adhesiveness between the powder adhesive and paper. More preferably, Eb−Ea is from 0.70 to 3.40.

The above Ea and Eb can be controlled on the basis of the types and amount ratios of the waxes contained in the toner and the powder adhesive. Further, the above Na and Nb can be controlled on the basis of the amounts of the waxes contained in the toner and the powder adhesive.

The wax contained in the powder adhesive preferably contains at least one selected from the group consisting of ester waxes represented by Formulae (1) and (2) below.

(1)

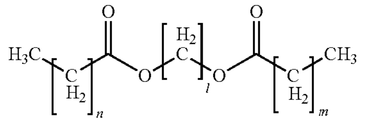

(2)

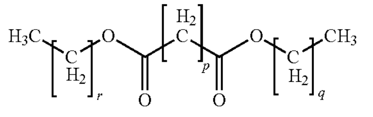

In the formulae, 1 represents a positive integer from 2 to 12 (preferably from 2 to 4), and n and m each independently represent a positive integer from 12 to 20 (preferably from 14 to 20). Further, p represents a positive integer from 2 to 10 (preferably from 2 to 4), and q and r each independently represent a positive integer from 11 to 21 (preferably from 14 to 20).

The ester waxes represented by Formula (1) and (2) have a linear structure, and hence crystallize readily and exhibit a high degree of crystallinity in the powder adhesive. A powder adhesive of yet better durability can be accordingly obtained. In consequence, contamination of a developing member or the like is unlikely to occur, even in mass printing. The positions of the ester groups in the ester wax represented by Formula (1) and the ester wax represented by Formula (2) are close to each other, therefore the waxes interact strongly with hydroxyl groups in cellulose. In consequence, permeation of the powder adhesive into the paper is readily promoted as a result, and stronger adhesive strength can be achieved.

More preferably, the ester wax is a compound represented by Formula (1), of which 1 represents 2, and n and m each independently represent a positive integer of 14 to 20. More preferably, the wax contained in the powder adhesive contains the ester wax represented by Formula (1), and in Formula (1), 1 represents 2, and n and m each independently represent a positive integer of 14 to 20.

When 1 represents 2 and n and m each independently represent a positive integer of 14 to 20 in Formula (1), the positions of the two ester groups in the molecule are close to each other, and accordingly the wax crystallizes yet more readily, and a powder adhesive of yet higher durability can be obtained. More preferably, n and m each independently are from 16 to 20.

Preferably, the wax contained in the powder adhesive further contains a chain saturated hydrocarbon having a peak carbon number from 20 to 70 (preferably from 30 to 60). The above chain saturated hydrocarbon crystallizes faster than the above ester wax, and acts as a crystal nucleating agent for the ester wax. As a result, the crystallinity of the ester wax is increased, and a powder adhesive of yet better durability can be obtained.

The peak carbon number is a value resulting from dividing a peak value of molecular weight of the chain saturated hydrocarbon, obtained in a molecular weight measurement, by 14, which is the formula mass of $CH_2$.

A content Nb1 of the ester wax in the powder adhesive is preferably from 8.0 mass % to 20.0 mass %, more preferably from 8.0 mass % to 15.0 mass %, and yet more preferably from 9.0 mass % to 12.0 mass %.

A content Nb2 of the chain saturated hydrocarbon having a peak carbon number from 20 to 70 in the powder adhesive is preferably from 0.1 mass % to 5.0 mass %, more preferably from 0.5 mass % to 3.0 mass %.

Preferably, the above Nb1 and Nb2 satisfy $$2.00 \leq Nb1/Nb2 \leq 25.00.$$

More preferably, Nb1/Nb2 is from 3.00 to 7.00.

Such a powder adhesive can be suitably used in electrophotographic processes, and allows obtaining strong adhesiveness.

Preferably, the content Nb of wax in the powder adhesive is from 8.0 mass % to 20.0 mass %. When Nb lies in the above range it becomes possible to prevent excessive permeation of the powder adhesive into paper, while improving adhesiveness between the powder adhesive and paper. Stronger adhesiveness is achieved as a result.

More preferably, Nb is from 10.0 mass % to 17.0 mass %, and yet more preferably from 10.0 mass % to 15.0 mass %.

Preferably, the content Na of wax in the toner is from 2.0 mass % to 15.0 mass %. The endothermic quantity of the toner can be curtailed, while lowering the adhesiveness between the toner and paper, by virtue of the fact that Na lies within the above range. Print transfer and strong adhesiveness both can be achieved at a yet higher level as a result.

More preferably, Na is from 5.0 mass % to 13.0 mass %, and yet more preferably from 5.0 mass % to 10.0 mass %.

The wax used in the toner is not particularly limited as long as it satisfies the above ester group concentration, and known waxes can be used herein. Specific examples of the wax include the following.

Hydrocarbon waxes (for instance petroleum waxes and derivatives thereof such as paraffin wax, microcrystalline wax and petrolatum; montan wax and derivatives thereof; hydrocarbon waxes and derivatives thereof obtained in accordance with the Fischer-Tropsch method; and polyolefin waxes and derivatives thereof such as polyethylene and polypropylene); natural waxes and derivatives thereof such as carnauba wax and candelilla wax; as well as ester waxes.

The term derivatives encompasses herein oxides, block copolymers with vinylic monomers, and graft-modified products.

Preferably, the wax contained in the toner is at least one selected from the group consisting of hydrocarbon waxes and ester waxes.

As the ester wax there can be used a monoester compound containing one ester bond per molecule, and a diester compound containing two ester bonds per molecule, and also multifunctional ester compounds such as trifunctional ester compounds containing three ester bonds per molecule, tetrafunctional ester compounds containing four ester bonds per molecule and hexafunctional ester compounds containing six ester bonds per molecule.

Preferably among the foregoing, the wax contains at least one compound selected from the group consisting of monoester compounds and diester compounds.

Specific examples of monoester compounds include waxes composed mainly of a fatty acid ester, such as carnauba wax and montan wax; waxes obtained by deacidifying part or the entirety of an acid component from a fatty acid ester, such as deacidified carnauba wax; waxes obtained through hydrogenation of vegetable oils; methyl ester compounds having a hydroxyl group; and saturated fatty acid monoesters such as stearyl stearate and behenyl behenate.

Specific examples of diester compounds include dibehenyl sebacate, nonanediol dibehenate, behenyl terephthalate and stearyl terephthalate. The wax may contain other known waxes, besides the above compounds. The waxes may be used as a single type alone; alternatively, two or more types may be used concomitantly.

The wax contained in the toner is preferably a saturated fatty acid monoester. Preferably, for instance, the toner contains an ester compound of a monoalcohol having 18 to 24 carbon atoms and a monocarboxylic acid having 18 to 24 carbon atoms. Behenyl behenate is more preferable.

Preferably the powder adhesive and the toner both contain at least one compound selected from the group consisting of monoester compounds and diester compounds.

Monoester compounds and diester compounds tend to exhibit a higher degree of crystallinity and a larger endothermic quantity than hydrocarbon waxes and trifunctional or higher ester compounds. When the powder adhesive and the toner satisfy the above conditions, it becomes therefore easier to match the melting behavior of the wax at the time of melting of the powder adhesive and the toner in the bonding step, and the effect derived from the above physical properties is readily brought out.

The thermoplastic resins contained in the toner and the powder adhesive are not particularly limited.

For instance, there can be used known thermoplastic resins such as polyester resins, vinyl resins, acrylic resins, styrene-acrylic resins, polyethylene, polypropylene, polyolefins, ethylene-vinyl acetate copolymer resins, and ethylene-acrylic acid copolymer resins. The toner and the powder adhesive may include a plurality of these resins. Further, the thermoplastic resins contained in the toner and the powder adhesive may be identical or may be different.

Preferably, the thermoplastic resins are a polyester resin or a styrene-acrylic resin, more preferably a styrene-acrylic resin, Preferably, the thermoplastic resins contained in the toner and the powder adhesive include at least one selected from the group consisting of polyester resins and styrene-acrylic resins, and include more preferably a styrene-acrylic resin. The content of the styrene-acrylic resin in the thermoplastic resins is preferably 50 mass % to 100 mass %, more preferably 80 mass % to 100 mass %, and yet more preferably 90 mass % to 100 mass %.

A known polyester resin can be used as the polyester resin.

Specific examples include dibasic acids and derivatives thereof (carboxylic acid halides, esters, and acid anhydrides) and condensed polymers of dihydric alcohols. If necessary, trivalent or higher polybasic acids and derivatives thereof (carboxylic acid halides, esters, and acid anhydrides), monobasic acids, trihydric or higher alcohols, and monohydric alcohols may be used.

Examples of the dibasic acid include aliphatic dibasic acids such as maleic acid, fumaric acid, itaconic acid, oxalic acid, malonic acid, succinic acid, dodecylsuccinic acid, dodecenylsuccinic acid, adipic acid, azelaic acid, sebacic acid, decane-1,10-dicarboxylic acid, and the like; aromatic dibasic acids such as phthalic acid, tetrahydrophthalic acid, hexahydrophthalic acid, tetrabromophthalic acid, tetrachlorophthalic acid, chlorendic acid, humic acid, isophthalic acid, terephthalic acid, 2,6-naphthalenedicarboxylic acid, and the like; and the like.

Examples of the dibasic acid derivatives include carboxylic acid halides, esters and acid anhydrides of the above-mentioned aliphatic dibasic acid and aromatic dibasic acid.

Meanwhile, examples of the dihydric alcohol include acyclic aliphatic diols such as ethylene glycol, 1,2-propanediol, 1,3-propanediol, 1,4-butanediol, 1,5-pentanediol, 1,6-hexanediol, diethylene glycol, dipropylene glycol, triethylene glycol, neopentyl glycol, and the like; bisphenols such as bisphenol A, bisphenol F, and the like; alkylene oxide adducts of bisphenol A such as bisphenol A ethylene oxide adduct, bisphenol A propylene oxide adduct, and the like; aralkylene glycols such as xylylene diglycol and the like; and the like.

Examples of the trivalent or higher polybasic acid and anhydrides thereof include trimellitic acid, trimellitic anhydride, pyromellitic acid, pyromellitic anhydride, and the like.

Examples of the polymerizable monomer capable of forming the styrene-acrylic resin include styrene-based monomers such as styrene, α-methylstyrene, and divinylbenzene; unsaturated carboxylic acid esters such as methyl acrylate, butyl acrylate, methyl methacrylate, and 2-hydroxyethyl methacrylate, t-butyl methacrylate, and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile vinyl monomers such as acrylonitrile; halogen-containing vinyl monomers such as vinyl chloride; nitrovinyl monomers such as nitrostyrene; and the like. These can be used alone or in combination of two or more.

The unsaturated carboxylic acid ester is preferably an alkyl (meth)acrylate ester with 1 to 8 (more preferably 2 to 6) carbon atoms in the alkyl group. Preferably, the styrene-acrylic resin is a copolymer of styrene and an alkyl (meth) acrylate ester with 1 to 8 (more preferably 2 to 6) carbon atoms in the alkyl group.

The content of the thermoplastic resin in the powder adhesive is preferably from 75.0 mass % to 92.0 mass %, more preferably from 80.0 mass % to 90.0 mass %.

The content of the thermoplastic resin in the toner is preferably from 75.0 mass % to 92.0 mass %, more preferably from 80.0 mass % to 90.0 mass %.

An ester group concentration Ec1 of the thermoplastic resin contained in the toner or an ester group concentration Ec2 of the thermoplastic resin contained in the powder adhesive each is preferably from 0.00 mmol/g to 2.50 mmol/g, and more preferably from 1.50 mmol/g to 2.20 mmol/g.

Prescribing the above range signifies lowering the ester group concentration of the thermoplastic resin. By prescribing the above range, the ester groups in the thermoplastic resin do not readily hinder interactions between the ester groups of the wax and the hydroxyl groups of paper, and as a result the effects of print transfer suppression and strong adhesive strength can be attained more readily.

A difference between the ester group concentration of the thermoplastic resin contained in the toner and the ester group concentration of the thermoplastic resin contained in the powder adhesive is preferably from 0.00 mmol/g to 1.50 mmol/g, more preferably from 0.00 mmol/g to 0.50 mmol/g. The effects of print transfer suppression and strong adhesive strength can be attained more readily thanks to the closeness of the ester group concentrations of the thermoplastic resins contained in the toner and the powder adhesive.

The ester group concentration of the thermoplastic resins can be controlled on the basis of the types and amount ratios of the monomers used in the thermoplastic resins.

The toner and the powder adhesive may include a colorant. Examples of the colorant include a black colorant, a yellow colorant, a magenta colorant, and a cyan colorant.

The black colorant is exemplified by carbon black.

Examples of the yellow colorant include yellow pigments represented by monoazo compounds; disazo compounds; condensed azo compounds; isoindolinone compounds; isoindoline compounds; benzimidazolone compounds; anthraquinone compounds; azo metal complexes; methine compounds; allylamide compounds, and the like. Specific examples include C. I. Pigment Yellow 74, 93, 95, 109, 111, 128, 155, 174, 180, 185, and the like.

Examples of the magenta colorant include magenta pigments represented by monoazo compounds; condensed azo compounds; diketopyrrolopyrrole compounds; anthraquinone compounds; quinacridone compounds; basic dye lake compounds; naphthol compounds; benzimidazolone compounds; thioindigo compounds; perylene compounds, and the like. Specific examples include C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, and 269, C. I. Pigment Violet 19 and the like.

Examples of the cyan colorant include cyan pigments represented by copper phthalocyanine compounds and derivatives thereof; anthraquinone compounds; basic dye lake compounds, and the like. Specific examples include C. I. Pigment Blue 1, 7, 15, 15:1, 15:2, 15:3, 15:4, 60, 62, and 66.

Further, various dyes conventionally known as colorants can be used together with the pigment.

The amount of the colorant in the toner is preferably from 1.0% by mass to 20.0% by mass.

The content of the colorant in the powder adhesive is preferably from 0.0 mass % to 1.0 mass %.

The toner and the powder adhesive may contain known materials such as a charge control agent, a charge control resin and a pigment dispersant, as needed.

As the case may require, the toner and the powder adhesive may be mixed with an external additive or the like to adhere to the surface of the toner or the powder adhesive.

Examples of the external additive include inorganic fine particles selected from silica fine particles, alumina fine particles and titania fine particles, and complex oxides of the foregoing. Examples of complex oxides include silica aluminum fine particles and strontium titanate fine particles.

The content of the external additive in the toner is preferably from 0.01 mass % to 10.0 mass %, more preferably from 0.1 mass % to 4.0 mass %.

The content the external additive in the powder adhesive is preferably from 0.01 mass % to 10.0 mass %, more preferably from 0.1 mass % to 4.0 mass %.

The difference between the amount of the external additive in the toner and the amount of the external additive in the powder adhesive is preferably from 0.0% by mass to 2.5% by mass, and more preferably from 0.0% by mass to 2.0% by mass.

A ratio of the content of the external additive in the toner and the content of the external additive in the powder adhesive (content of external additive in toner: content of external additive in powder adhesive) is preferably 1.0:8.0 to 8.0:1.0, more preferably 1.0:4.0 to 4.0:1.0, and yet more preferably 1.0:2.0 to 2.0:1.0.

The glass transition temperatures (Tg) of the toner and of powder adhesive are preferably from 45° C. to 60° C., respectively. Within the above range, the toner or powder adhesive can be suitably used in an electrophotographic process, and the effects of print transfer suppression and strong adhesive strength can be brought out at a yet higher level.

The difference between the Tg of the toner and the Tg of the powder adhesive is preferably from 0° C. to 10° C., more preferably from 0° C. to 7° C. Thanks to the closeness between the Tg of the toner and the Tg of the powder adhesive, the molten states of the foregoing in the bonding step can be brought close to each other, and accordingly the effects of print transfer suppression and strong adhesive strength can be readily elicited. The Tg of the toner and Tg of the powder adhesive can be controlled on the basis of the type and amount ratio of the monomers used in the thermoplastic resins of the toner and of the powder adhesive, or on the basis of the types and amount ratios of the waxes that are used.

The weight-average particle diameter (D4) of the toner is preferably from 4.0 μm to 15.0 μm. Within the above range the molten state in the bonding step can be made uniform, and accordingly a toner can be obtained that is yet less likely to exhibit print transfer.

The weight-average particle diameter (D4) of the powder adhesive is preferably from 4.0 μm to 20.0 μm. Within the above range, the thickness of the adhesive portion can be made sufficiently large while uniformizing the molten state in the bonding step, so that a stronger adhesive strength can be obtained as a result.

Further, a difference between the weight-average particle diameter (D4) of the toner and the weight-average particle diameter (D4) of the powder adhesive is preferably from 0.0 μm to 5.0 μm. Thanks to the closeness of the weight-average particle diameters (D4) of the toner and of the powder adhesive, the molten states of the foregoing in the bonding step can be brought close to each other, and accordingly the effects of print transfer suppression and strong adhesive strength can be readily elicited. The weight-average particle diameters (D4) of the toner and the powder adhesive can be controlled on the basis of the production methods of the toner and of the powder adhesive.

Preferably, the peak molecular weight of a main peak in both the toner and the powder adhesive is from 10,000 to 40,000. Within the above range, the toner or powder adhesive can be suitably used in an electrophotographic process, and the effects of print transfer suppression and strong adhesive strength can be brought out at a yet higher level.

Preferably, the difference between the peak molecular weight of the toner and the peak molecular weight of the powder adhesive is from 0 to 15,000. By virtue of the fact that the peak molecular weights of the toner and the powder adhesive are close to each other, the molten states of the foregoing in the bonding step can be brought close to each other, and accordingly, the effects of print transfer suppression and strong adhesive strength can be readily elicited. The peak molecular weight can be controlled on the basis of the production conditions of the thermoplastic resins of the toner and the powder adhesive.

The toner or powder adhesive can be produced in accordance with a known method, such as pulverization, suspension polymerization, emulsification aggregation or dissolution suspension; the production method is not particularly limited herein.

Preferably, the powder adhesive is a powder adhesive comprising a thermoplastic resin, a compound represented by above Formula (1), of which 1 represents 2, and n and m each independently represent a positive integer of 14 to 20, and a chain saturated hydrocarbon having a peak carbon number of 20 to 70, wherein

- the thermoplastic resin is a styrene-acrylic resin,
- a content of the thermoplastic resin in the powder adhesive is 75.0 to 92.0 mass %,
- a content Nb1 of the compound represented by Formula (1) in the powder adhesive is 8.0 to 20.0 mass %,
- a content Nb2 of the chain saturated hydrocarbon having a peak carbon number of 20 to 70 in the powder adhesive is 0.1 to 5.0 mass %, and
- the Nb1 and the Nb2 satisfy $$2.00 \leq Nb1/Nb2 \leq 25.00.$$

Such a powder adhesive can be suitably used in electrophotographic processes, and allows obtaining strong adhesiveness.

Preferably, Nb1 is from 8.0 mass % to 15.0 mass %, more preferably from 9.0 mass % to 12.0 mass %. More preferably, Nb2 is from 0.5 mass % to 3.0 mass %.

More preferably, Nb1/Nb2 is from 3.00 to 7.00.

Specifically described hereinbelow is an example of an image forming apparatus and a processing device for performing bonding process of paper, which an electrophotographic developer containing a toner and a powder adhesive can be suitably used.

Overall Apparatus Configuration

First, the overall configuration of the image forming apparatus will be described with reference to FIGS. 1, 2, and 5. FIG. 1 is a schematic diagram illustrating a cross-sectional configuration of an image forming apparatus 1 including an image forming apparatus body (hereinafter, referred to as an apparatus body 10) and a post-processing unit 30 connected to the apparatus body 10. The image forming apparatus 1 is an electrophotographic image forming apparatus (electrophotographic system) configured of the apparatus body 10 provided with an electrophotographic printing mechanism, and a post-processing unit 30 as a sheet processing device.

Figure 5:
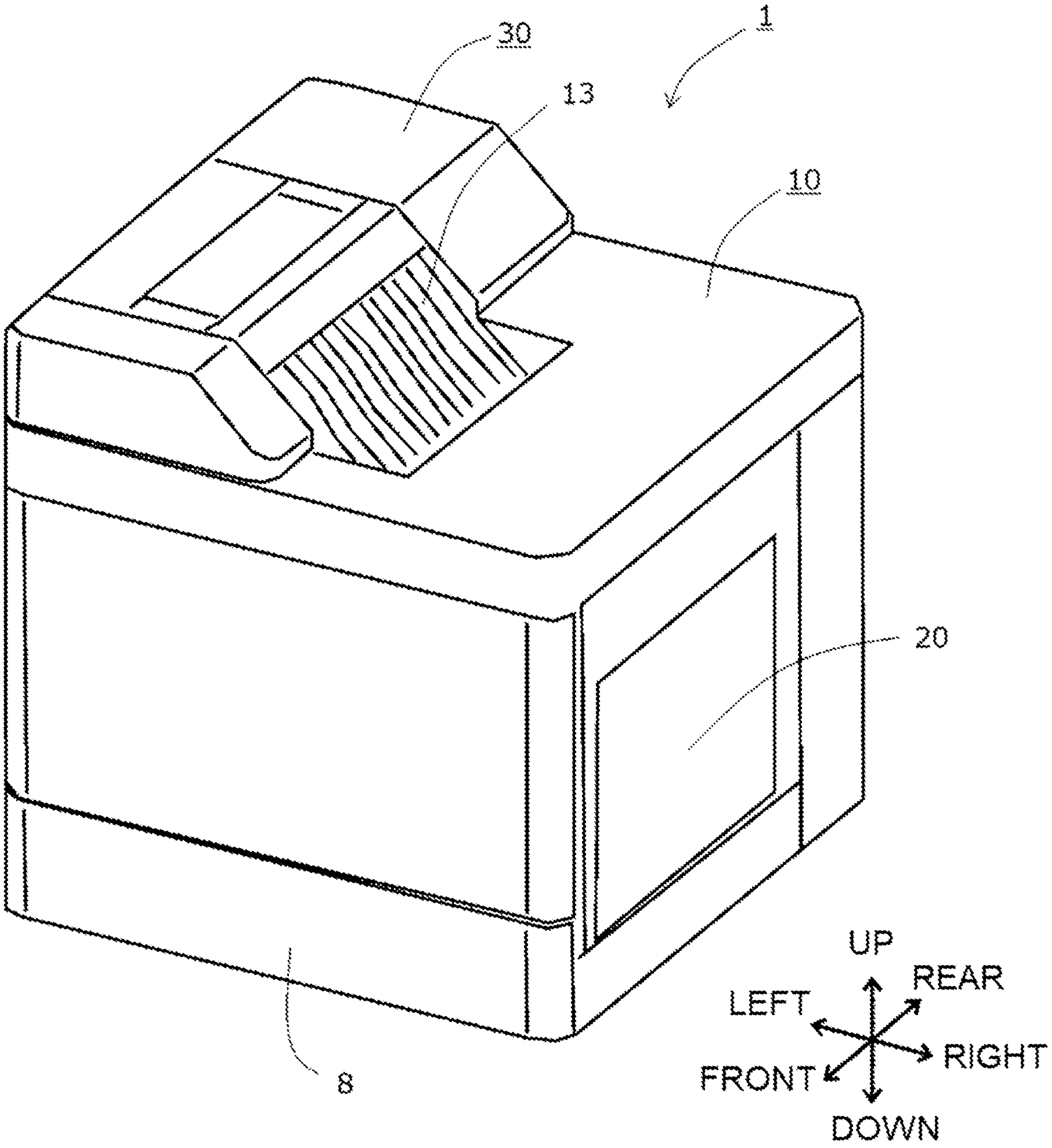
FIG. 5 is a perspective-view diagram illustrating the appearance of an image forming apparatus.

FIG. 5 is a perspective-view diagram illustrating the appearance of the image forming apparatus 1. The post-processing unit 30 is mounted on top of the apparatus body 10. The image forming apparatus 1 has a sheet cassette 8 at the bottom, an openable/closable tray 20 on the right side, and a first discharge tray 13 on the top side.

First, the internal configuration of the apparatus body 10 will be described. As shown in FIG. 1, the apparatus body 10 is provided with the sheet cassette 8 as a sheet accommodating portion for accommodating a sheet P which is a recording medium, an image forming unit 1*e* as an image forming means, a first fixing unit 6 as a fixing means, and a housing 19 for accommodating these units. The apparatus body 10 has a printing function of forming a toner image on the sheet P fed from the sheet cassette 8 by an image forming unit 1*e* and producing a printed product subjected to a fixing process by the first fixing unit 6.

The sheet cassette 8 is retractably inserted into the housing 19 at the bottom of the apparatus body 10, and accommodates a large number of sheets P. The sheets P accommodated in the sheet cassette 8 are fed from the sheet cassette 8 by a feeding member such as a feeding roller, and are transported by a transport roller 8*a* in a state of being separated one by one by a pair of separating rollers. It is also possible to feed the sheets set on an open tray 20 (FIG. 5) one by one.

The image forming unit 1*e* is a tandem type electrophotographic unit provided with four process cartridges 7*n*, 7*y*, 7*m*, and 7*c*, a scanner unit 2, and a transfer unit 3. The term process cartridge denotes a unit in which multiple components involved in the image forming process are integrally and replaceably configured into a unit.

The apparatus body 10 is provided with a cartridge support portion 9 supported by the housing 19, and the process cartridges 7*n*, 7*y*, 7*m*, and 7*c* are detachably mounted on mounting portions 9*n*, 9*y*, 9*m*, and 9*c* provided in the cartridge support portion 9. The cartridge support portion 9 may be a tray member that can be pulled out from the housing 19.

The process cartridges 7*n*, 7*y*, 7*m*, and 7*c* have a substantially common configuration except for the types of powders accommodated in four powder accommodating portions 104*n*, 104*y*, 104*m*, and 104*c*. That is, each process cartridge 7*n*, 7*y*, 7*m*, and 7*c* includes a photosensitive drum 101 as an image bearing member, a charging roller 102 as a charging device, powder accommodating portions 104*n*, 104*y*, 104*m*, and 104*c* that accommodate powders, and a developing roller 105 that performs development using the powder.

Of the four powder accommodating portions, the three powder accommodating portions 104*y*, 104*m*, and 104*c* on the right side in the figure accommodate yellow, magenta and cyan printing toners Ty, Tm, and Tc, respectively, as toners (first powder) for forming a visible image on the sheet P. Meanwhile, a powder adhesive Tn, which is a powder (second powder) for performing a bonding process after printing, is accommodated in the powder accommodating portion 104*n* on the leftmost side in the figure.

The powder accommodating portions 104*y*, 104*m*, and 104*c* are all examples of the first accommodating portion that accommodates the printing toner, and the powder accommodating portion 104*n* is an example of the second accommodating portion that accommodates the powder adhesive. Further, the process cartridges 7*y*, 7*m*, and 7*c* are all examples of the first process unit that forms a toner image using a printing toner, and the process cartridge 7*n* is an example of the second process unit that forms an image of a powder adhesive in a predetermined application pattern.

When printing a black image such as text, the image is expressed in process black in which yellow (Ty), magenta (Tm), and cyan (Tc) toners are superimposed. However, for example, a fifth process cartridge that uses a black printing toner may be added to the image forming unit 1*e* so that the black image can be expressed by the black printing toner. Such options are not limiting, and the type and number of printing toners can be changed according to the application of the image forming apparatus 1.

The scanner unit 2 is arranged below the process cartridges 7*n*, 7*y*, 7*m*, and 7*c* and above the sheet cassette 8. The scanner unit 2 is an exposure means for irradiating the photosensitive drum 101 of each process cartridge 7*n*, 7*y*, 7*m*, and 7*c* with laser light G and writing an electrostatic latent image.

The transfer unit 3 includes a transfer belt 3*a* as an intermediate transfer body (secondary image bearing member). The transfer belt 3*a* is a belt member wound around a secondary transfer inner roller 3*b* and a tension roller 3*c*, and faces the photosensitive drum 101 of each process cartridge 7*n*, 7*y*, 7*m*, and 7*c* on the outer peripheral surface.

On the inner peripheral side of the transfer belt 3*a* there are arranged primary transfer rollers 4, at positions corresponding to respective photosensitive drums 101. Further, a secondary transfer roller 5 as a transfer means is arranged at a position opposing the secondary transfer inner roller 3*b*. A transfer nip 5*n* between the secondary transfer roller 5 and the transfer belt 3*a* is a transfer section (secondary transfer section) in which the toner image is transferred from the transfer belt 3*a* to the sheet P.

The first fixing unit 6 is arranged above the secondary transfer roller 5. The first fixing unit 6 is a heat fixing type fixing unit having a heat roller 6*a* as a fixing member and a pressure roller 6*b* as a pressing member. The heat roller 6*a* is heated by a heat generating element such as a halogen lamp, a ceramic heater or a heating mechanism of induction heating type. The pressure roller 6*b* is pressed against the heat roller 6*a* by an urging member such as a spring, and generates a pressurizing force that pressurizes the sheet P passing through the nip portion (fixing nip 6*n*) of the heat roller 6*a* and the pressure roller 6*b*.

The housing 19 is provided with a discharge port 12 (first discharge port), which is an opening for discharging the sheet P from the apparatus body 10, and a discharge unit 34 is arranged in the discharge port 12. The discharge unit 34, which is a discharge means, uses a so-called triple roller having a first discharge roller 34*a*, an intermediate roller 34*b*, and a second discharge roller 34*c*.

Further, a switching guide 33, which is a flap-shaped guide for switching the transport path of the sheet P, is provided between the first fixing unit 6 and the discharge unit 34. The switching guide 33 is rotatable around a shaft portion 33*a* so that a tip 33*b* reciprocates in the direction of arrow c in the figure.

The apparatus body 10 is provided with a mechanism for performing double-sided printing.

A motor (not shown) is connected to the discharge unit 34 and configured so that the rotation direction of the intermediate roller 34*b* can be forward and reverse. Further, a double-sided transport path 1*r* is provided as a transport path connected in a loop to a main transport path 1*m*. The sheet P where an image has been formed on the first surface while passing through the main transport path 1*m* is nipped and transported by the first discharge roller 34*a* and the intermediate roller 34*b* with the switching guide 33 which is rotated clockwise.

After the rear end of the sheet P in the traveling direction passes through the switching guide 33, the switching guide 33 rotates counterclockwise, the intermediate roller 34*b* reverses, and the sheet P is reversely transported to the double-sided transport path 1*r*. Then, an image is formed on the second surface of the sheet P while the sheet P passes through the main transport path 1*m* again with the front and back reversed.

The sheet P after double-sided printing is nipped and transported by the intermediate roller 34*b* and the second discharge roller 34*c* with the switching guide 33 rotated counterclockwise, and is discharged from the apparatus body 10.

Further, the transport path passing through the transport roller 8*a*, the transfer nip 5*n*, and the fixing nip 6*n* in the apparatus body 10 constitutes the main transport path 1*m* in which an image is formed on the sheet P. The main transport path 1*m* extends from the bottom to the top through one side in the horizontal direction with respect to the image forming unit 1*e* when viewed from the main scanning direction (the width direction of the sheet perpendicular to the transport direction of the sheet transported along the main transport path 1*m*) at the time of image formation.

In other words, the apparatus body 10 is a so-called vertical transport type (vertical path type) printer in which the main transport path 1*m* extends in a substantially vertical direction. When viewed in the vertical direction, the first discharge tray 13, the intermediate path 15, and the sheet cassette 8 overlap each other. Therefore, the moving direction of the sheet when the discharge unit 34 discharges the sheet P in the horizontal direction is opposite to the moving direction of the sheet when the sheet P is fed from the sheet cassette 8 in the horizontal direction.

Further, from the viewpoint of FIG. 1 (a view in the main scanning direction at the time of image formation), it is preferable that the horizontal occupied range of the main body portion of the post-processing unit 30 excluding the second discharge tray 35 fit into the occupied range of the apparatus body 10. By fitting the post-processing unit 30 in the space above the apparatus body 10 in this way, the image forming apparatus 1 having an adhesive printing function can be installed in about the same installation space as a normal vertical path printer.

Bonding Unit

Figure 2:
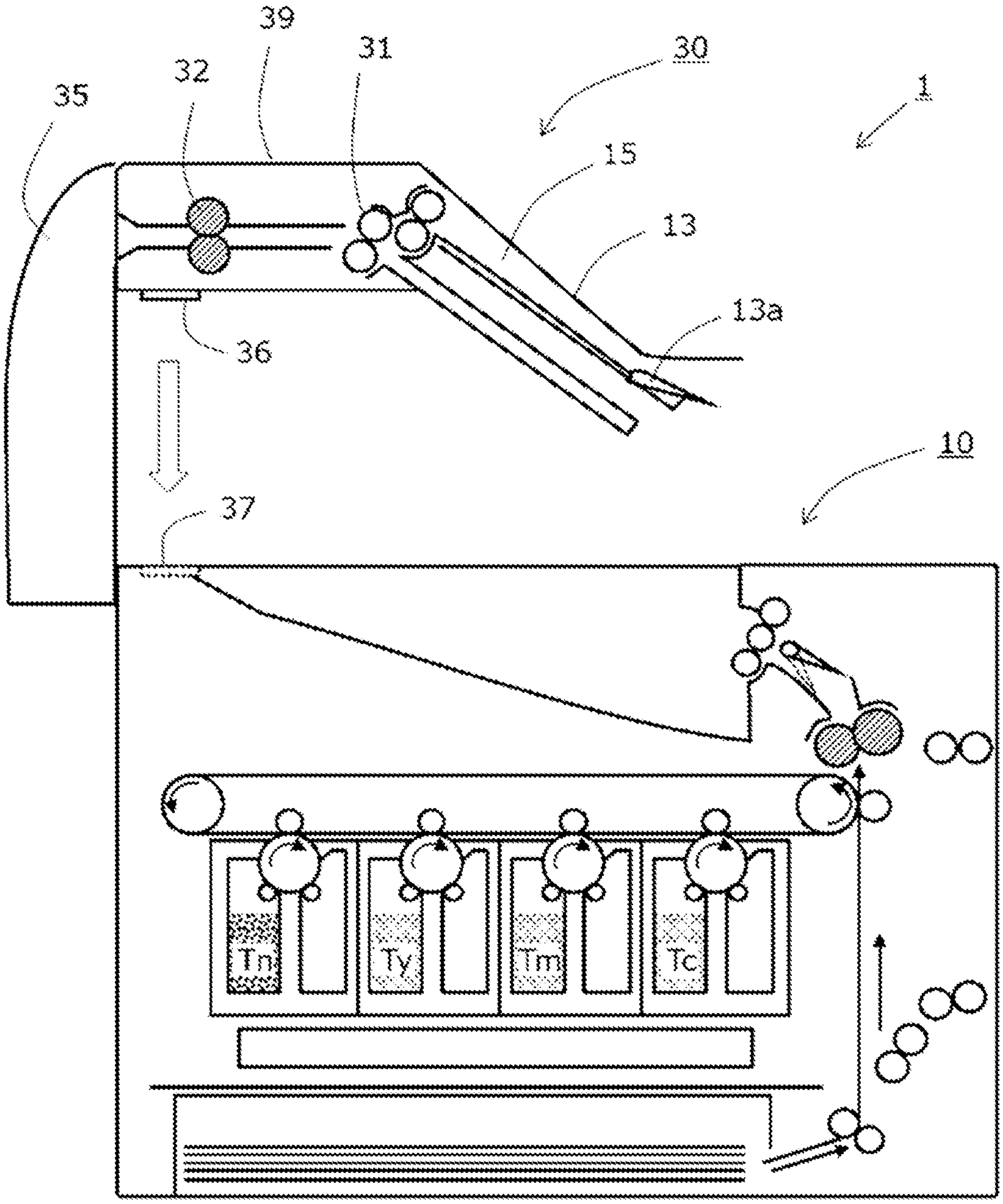
FIG. 2 is a diagram for explaining mounting of a bonding unit on the apparatus body of an image forming apparatus.

As shown in FIG. 2, the post-processing unit 30 is attached to the top of the apparatus body 10. In the post-processing unit 30, a folding device 31 as a folding means and the second fixing unit 32 as an adhesive bonding means (second fixing means) are accommodated in a housing (second housing) 39 and integrated.

Further, the post-processing unit 30 is provided with a first discharge tray 13 for rotatably holding the tray switching guide 13*a*, an intermediate path 15, and a second discharge tray 35. The first discharge tray 13 is provided on the upper surface of the post-processing unit 30, and is located on the top face (FIG. 1) of the entire image forming apparatus 1. The functions of each part included in the post-processing unit 30 will be described hereinbelow.

The post-processing unit 30 has a positioning portion (for example, a convex shape that engages with a concave portion of the housing 19) for positioning the housing 39 with respect to the housing 19 (first housing) of the apparatus body 10. Further, the post-processing unit 30 is provided with a drive source and a control unit separate from the apparatus body 10, and the connector 36 of the post-processing unit 30 and the connector 37 of the apparatus body 10 are joined together to electrically connect the post-processing unit to the apparatus body 10. As a result, the post-processing unit 30 is brought into an operating state based on a command from the control unit provided in the apparatus body 10 by using the electric power supplied through the apparatus body 10.

Process Cartridge

Figure 7:
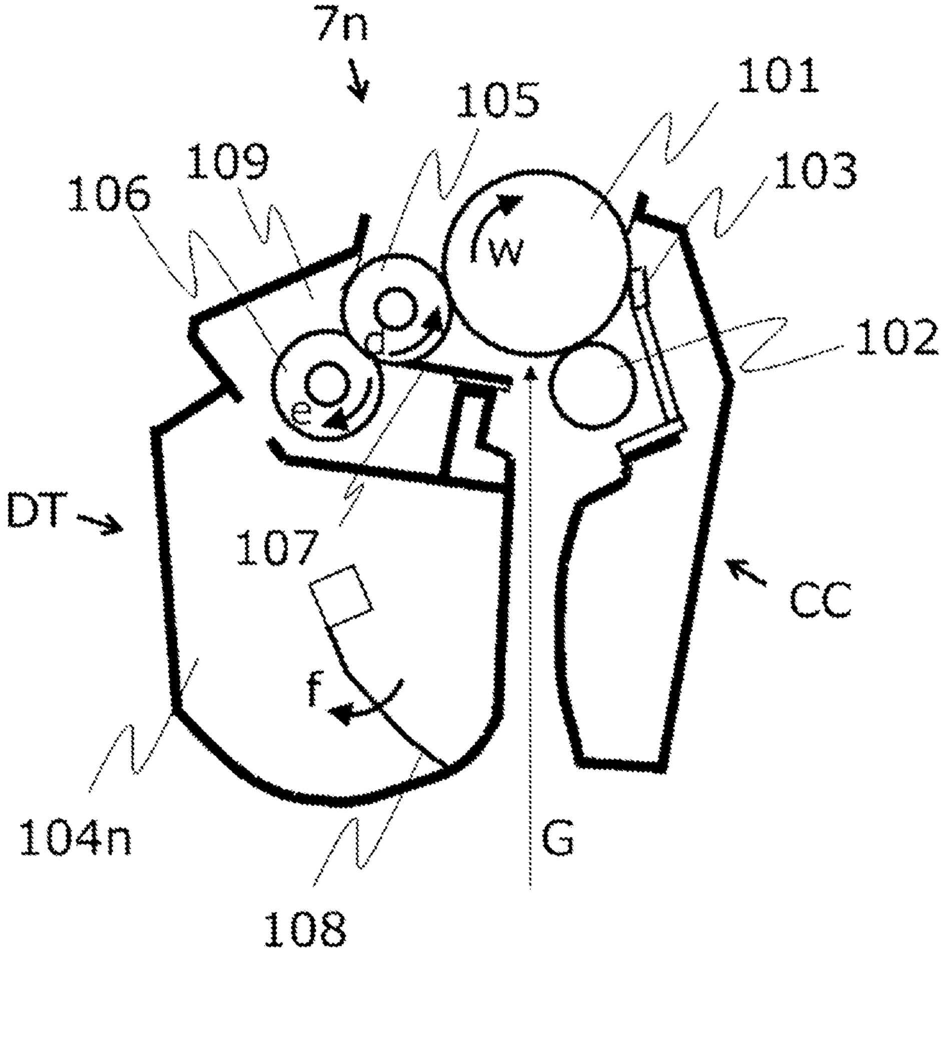
FIG. 7 is a schematic drawing of a process cartridge.

As described above, the process cartridges 7*n*, 7*y*, 7*m*, and 7*c* have substantially the same configuration except for the types of powders accommodated in the four powder accommodating portions 104*n*, 104*y*, 104*m*, and 104*c*. Here, the process cartridge 7*n* will be described as a representative cartridge. FIG. 7 is a schematic cross-sectional view of the process cartridge 7*n*. The process cartridge 7*n* includes a photosensitive member unit CC including a photosensitive drum 101 and the like, and a developing unit DT including a developing roller 105 and the like.

The photosensitive drum 101 is rotatably attached to the photosensitive member unit CC via a bearing (not shown). Further, the photosensitive drum 101 is rotationally driven in the clockwise direction (arrow w) in the figure according to the image forming operation by receiving the driving force of the drive motor as a driving means (driving source) (not shown). Further, in the photosensitive member unit CC, the charging roller 102 and a cleaning member 103 for charging the photosensitive drum 101 are arranged around the photosensitive drum 101.

The developing unit DT is provided with the developing roller 105 as a developer carrying member that comes into contact with the photosensitive drum 101 and rotates counterclockwise (arrow d) in the figure. The developing roller 105 and the photosensitive drum 101 rotate so that their surfaces move in the same direction at the facing portion (contact portion).

Further, a developer supply roller 106 (hereinafter, simply referred to as "supply roller") as a developer supply member that rotates in the clockwise direction (arrow e) in the drawing is arranged in the developing unit DT. The supply roller 106 and the developing roller 105 rotate so that their surfaces move in the same direction at the facing portion (contact portion).

The supply roller 106 acts to supply a powder adhesive (the printing toner in the case of process cartridges 7*y*, 7*m*, and 7*c*) onto the developing roller 105 and to peel off the powder adhesive (the printing toner in the case of process cartridges 7*y*, 7*m*, and 7*c*) remaining on the developing roller 105 from the developing roller 105.

Further, a developing blade 107 as a developer regulating member that regulates the layer thickness of the powder adhesive (the printing toner in the case of process cartridges 7*y*, 7*m*, and 7*c*) supplied on the developing roller 105 by the supply roller 106 is arranged in the developing unit DT.

The powder adhesive (the printing toner in the case of process cartridges 7*y*, 7*m*, and 7*c*) is stored as powder in the powder accommodating portion 104*n*. Further, a rotatably supported transport member 108 is provided in the powder accommodating portion 104*n*. A stirring member 108 rotates in the clockwise direction (arrow f) in the figure to stir the powder stored in the powder accommodating portion 104*n* and transports the powder to the developing chamber 109 provided with the developing roller 105 or the supply roller 106.

Here, the photosensitive member unit CC and the developing unit DT can also be configured as separate photoconductive unit cartridge and developing unit cartridge to enable detachable attachment thereof to the image forming apparatus body. Further, the units can also be configured as a powder cartridge that has only the powder accommodating portion 104 and the transport member 108 and is detachable from the apparatus body.

Image Forming Operations

Figure 3A:
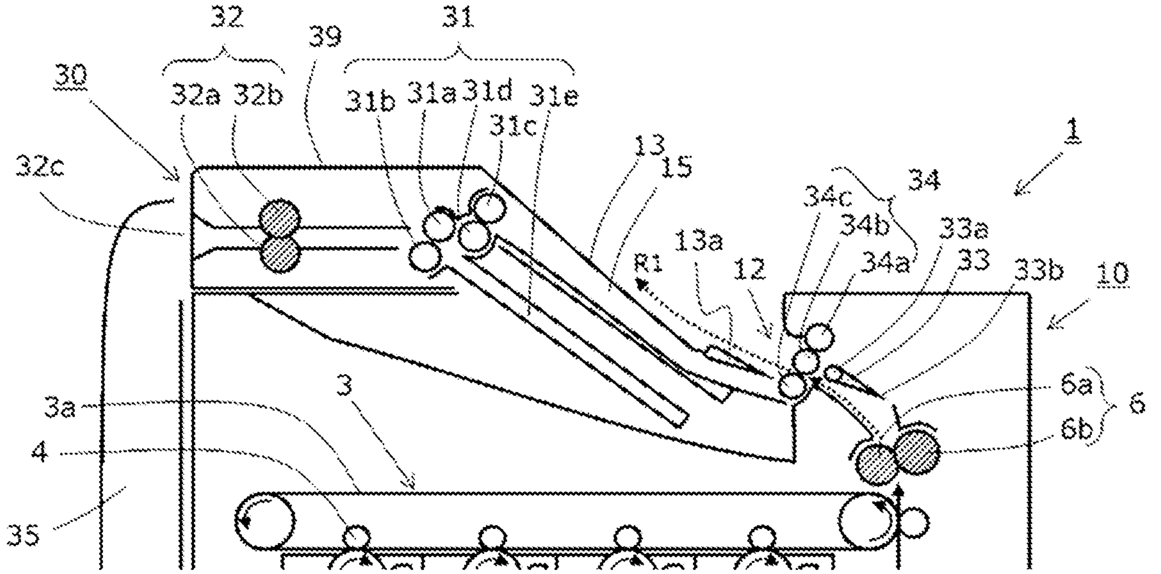
FIGS. 3A and 3B are diagrams illustrating transport paths of sheets in an image forming apparatus.
Figure 3B:
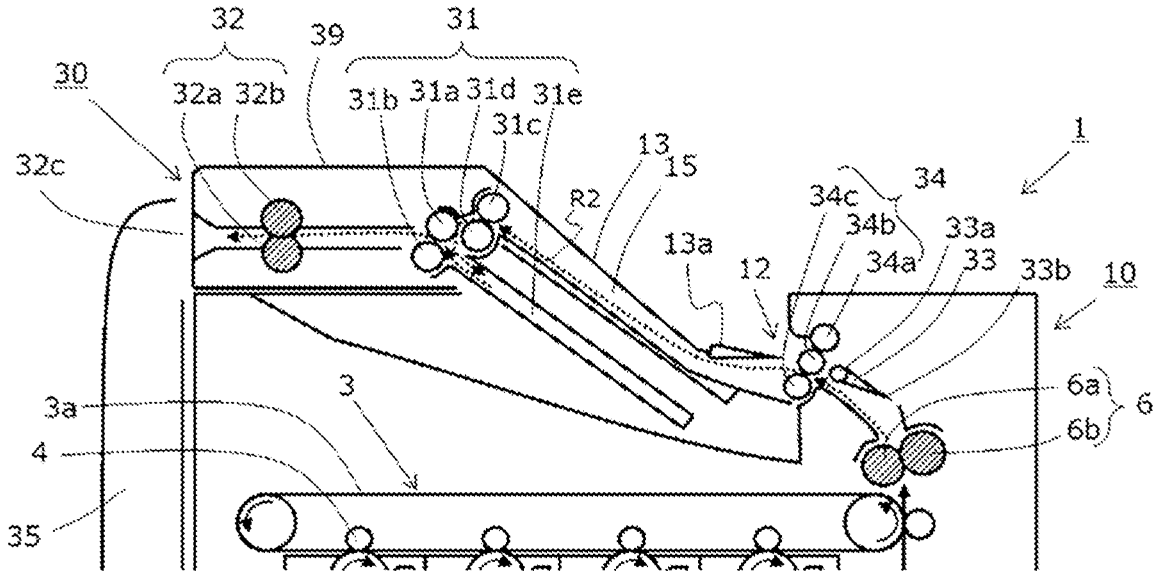
Figure 6A:
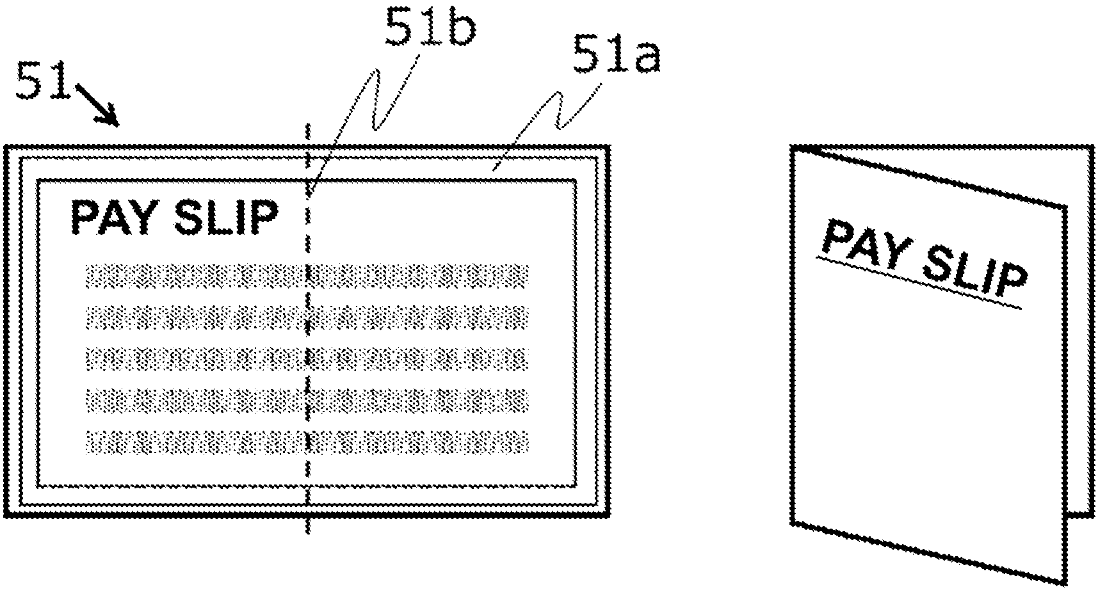
FIGS. 6A and 6B are diagrams illustrating a deliverable outputted by an image forming apparatus.
Figure 6B:
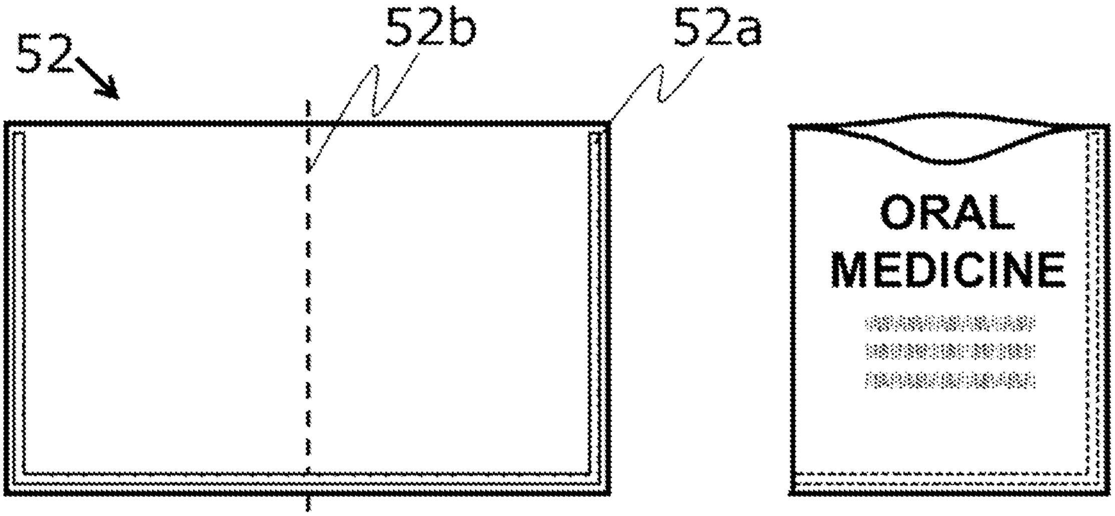

Next, the image forming operations performed by the image forming apparatus 1 will be described with reference to FIGS. 1 to 7. FIGS. 3A and 3B are diagrams illustrating a sheet transport path in the image forming apparatus 1. FIGS. 4A to 4F are diagrams for explaining the particulars of the folding process. FIGS. 6A and 6B are diagrams illustrating deliverable outputted by the image forming apparatus 1.

When image data to be printed and a print execution command are input to the image forming apparatus 1, the control unit of the image forming apparatus 1 starts a series of operations (image forming operations) for transporting the sheet P to form an image, and if necessary, for performing post-processing with the post-processing unit 30. In the image forming operations, first, as shown in FIG. 1, the sheets P are fed one by one from the sheet cassette 8 and transported toward the transfer nip 5*n* via the transport roller 8*a*.

The process cartridges 7*n*, 7*y*, 7*m*, and 7*c* are sequentially driven in parallel with the feeding of the sheet P, and the photosensitive drum 101 is rotationally driven in the clockwise direction (arrow w) in the figure. At this time, the photosensitive drum 101 is uniformly charged on the surface by the charging roller 102.

Further, the scanner unit 2 irradiates the photosensitive drum 101 of each process cartridge 7*n*, 7*y*, 7*m*, and 7*c* with a laser beam G modulated based on the image data to form an electrostatic latent image on the surface of the photosensitive drum 101. Next, the electrostatic latent image on the photosensitive drum 101 is developed as a powder image by the powder borne on the developing rollers 105 of each process cartridge 7*n*, 7*y*, 7*m*, and 7*c*.

The powder adhesive layer formed by the powder adhesive Tn on the photosensitive drum 101 by the development is different from the toner image (normal toner image) of the printing toner for recording an image such as a figure and text on the sheet P in that the powder adhesive layer is not intended to transmit visual information. However, in the following description, the layer of the powder adhesive Tn formed in a shape corresponding to an application pattern by the electrophotographic process in order to apply the powder adhesive Tn to the sheet P in a predetermined application pattern is also handled as a "toner image".

The transfer belt 3*a* rotates in the counterclockwise direction (arrow v) in the figure. The toner image formed in the process cartridges 7*n*, 7*y*, 7*m*, and 7*c* is primarily transferred from the photosensitive drum 101 to the transfer belt 3*a* by the electric field formed between the photosensitive drum 101 and the primary transfer roller 4.

The toner image that is borne on the transfer belt 3*a* and has reached the transfer nip 5*n* is secondarily transferred by the electric field formed between the secondary transfer roller 5 and the secondary transfer inner roller 3*b* to the sheet P that has been transported along the main transport path 1*m*.

After that, the sheet P is transported to the first fixing unit 6 to undergo heat fixing treatment. That is, when the sheet P passes through the fixing nip 6*n*, the toner image on the sheet P is heated and pressurized, so that the printing toners Ty, Tm, and Tc and the powder adhesive Tn are melted and then fixed, so that an image fixed to the sheet P is obtained.

Regardless of whether single-sided printing or double-sided printing is performed, the sheet P discharged from the apparatus body 10 is nipped between the intermediate roller 34*b* and the second discharge roller 34*c*, as shown in FIGS. 3A and 3B, and is transported to the first route R1 or the second route R2 by the tray switching guide 13*a*.

In the first route R1 shown in FIG. 3A, the sheet P that has passed through the first fixing unit 6 is discharged to the first discharge tray 13 by the discharge unit 34 in the normal printing mode in which the post-processing unit 30 is not used.

In the second route R2 shown in FIG. 3B, the sheet P that has passed through the first fixing unit 6 is discharged to the second discharge tray 35 through the discharge unit 34, the folding device 31, and the second fixing unit 32 in the adhesive printing mode.

An intermediate path 15 is provided between the first fixing unit 6 and the folding device 31 in the second route R2. The intermediate path 15 is a sheet transport path that passes through the upper surface portion (top surface portion) of the image forming apparatus 1 and extends substantially parallel to the first discharge tray 13 below the first discharge tray 13. The intermediate path 15 and the first discharge tray 13 are inclined upward in the vertical direction toward the folding device 31 in the horizontal direction. Therefore, the inlet of the folding device 31 (guide roller pair (31*c* and 31*d*) described hereinbelow) is located vertically above the outlet (the nip of the intermediate roller 34*b* and the second discharge roller 34*c*) of the apparatus body 10.

The folding device 31 has four rollers: a first guide roller 31*c*, a second guide roller 31*d*, a first folding roller 31*a*, and a second folding roller 31*b*, and a draw-in portion 31*e*. The first guide roller 31*c* and the second guide roller 31*d* are a pair of guide rollers that nip and transport the sheet P received from the transfer path (intermediate path 15 in the present embodiment) on the upstream side of the folding device 31. The first folding roller 31*a* and the second folding roller 31*b* are a pair of folding rollers that feed out the sheet P while bending the sheet.

A spacing M (FIG. 1) from the second discharge roller 34*c* to the first guide roller 31*c* in the sheet transport direction along the second route R2 is configured to be shorter than the total length L (FIG. 4A) of the sheet P in the transport direction before the folding process. In other words, the spacing M from the second discharge roller 34*c* to the first guide roller 31*c* determines the lower limit of the length of the sheet in the transport direction that can be processed by the post-processing unit 30. With this configuration, the sheet P is delivered from the discharge unit 34 to the guide roller pair without delay.

The folding process performed by the folding device 31 will be described with reference to FIGS. 4A to 4F. When the folding process is executed, the first guide roller 31*c* and the first folding roller 31*a* rotate clockwise in the figure, and the second guide roller 31*d* and the second folding roller 31*b* rotate counterclockwise in the figure.

Figure 4A:
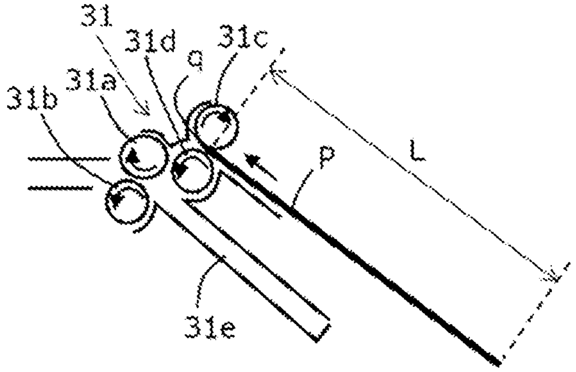
FIGS. 4A to 4F are diagrams for explaining the particulars of a folding process.

First, the front end q of the sheet P fed out from the discharge unit 34 is pulled into the guide roller pair (31*c* and 31*d*) as shown in FIG. 4A. As shown in FIG. 4B, the front end q of the sheet P is guided downward by the guide wall 31*f*, contacted with the first folding roller 31*a*, pulled between the first folding roller 31*a* and the second guide roller 31*d* facing each other, and brought into contact with the wall 31*g* of the draw-in portion 31*e*.

Figure 4D:
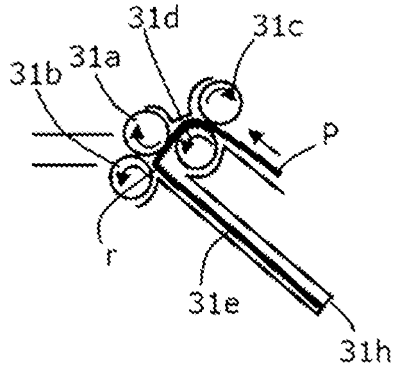
Figure 4B:
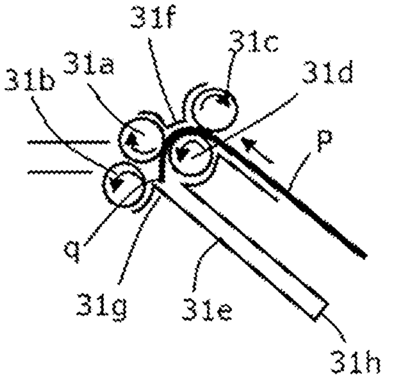
Figure 4E:
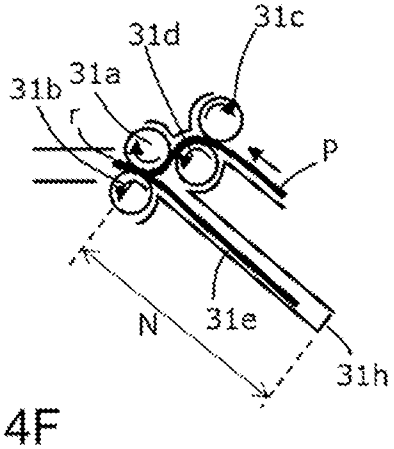
Figure 4C:
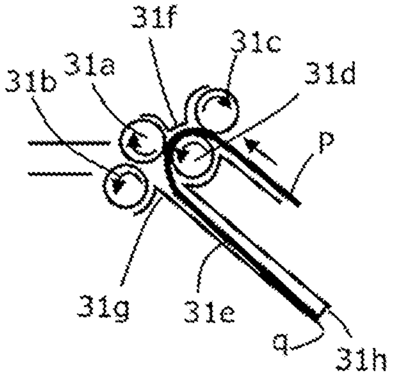
Figure 4F:
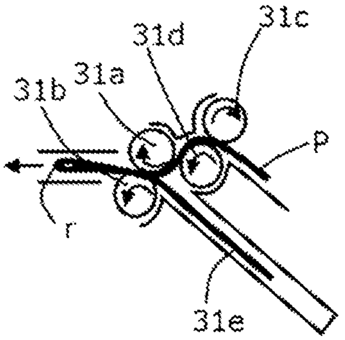

As the sheet P is pulled in by the guide roller pair (31*c* and 31*d*), the front end q advances to the back of the draw-in portion 31*e* while sliding in contact with the wall 31*g*. Eventually, the front end q abuts against an end portion 31*h* of the draw-in portion 31*e* as shown in FIG. 4C. The draw-in portion 31*e* forms a space extending substantially parallel to the intermediate path 15 below the intermediate path 15, and the sheet P is wound into a U-shaped bent state around the second guide roller 31*d* at the stage shown in FIG. 4C.

Where the sheet P is further pulled in by the guide roller pair (31*c* and 31*d*) from the state shown in FIG. 4C, deflection begins to occur in the middle portion r as shown in FIG. 4D. Eventually, as shown in FIG. 4E, the middle portion r comes into contact with the second folding roller 31*b*, thereby being pulled into the nip portion of the folding roller pair (31*a* and 31*b*) by the frictional force received from the second folding roller 31*b*. Then, as shown in FIG. 4F, the sheet P is discharged with the middle portion r at the front end by the folding roller pair (31*a* and 31*b*) in a state of being folded with the middle portion r as a crease.

Here, a depth N (FIG. 4E) of the draw-in portion 31*e*, that is, a distance from the nip portion of the folding roller pair (31*a* and 31*b*) to the end portion 31*h* of the draw-in portion 31*e* is set to the length which is half of the total length L of the sheet P. As a result, the folding device 31 can execute a process (middle folding) of folding the sheet P in half at half length. By changing the depth N of the draw-in portion 31*e*, the position of the crease can be arbitrarily changed.

The folding device 31 described above is an example of folding means, and for example, a folding mechanism that forms a crease by pressing a blade against the sheet P and pushing it into the nip portion of the roller pair may be used. Further, the contents of the folding process are not limited to folding in half, and for example, a folding mechanism that executes Z folding or tri-folding may be used.

Since the folding device 31 is configured of a rotating roller and a fixed draw-in portion 31*e*, the drive mechanism can be simplified as compared with a folding mechanism using a reciprocating blade. Further, since the folding device 31 may be provided with a draw-in portion 31*e* having a depth N of half the sheet length in addition to the four rollers, the post-processing unit 30 can be miniaturized.

The sheet P that has passed through the folding device 31 is transported to the second fixing unit 32 as shown in FIG. 3B. The second fixing unit 32 has a heat fixing configuration similar to the first fixing unit 6. That is, the second fixing unit 32 has a heat roller 32*b* as a heating member and a pressure roller 32*a* as a pressing member. The heat roller 32*b* is heated by a heat generating element such as a halogen lamp or a ceramic heater, or by a heating mechanism of induction heating type.

The pressure roller 32*a* is pressed against the heat roller 32*a* by an urging member such as a spring and generates a pressurizing force that pressurizes the sheet P passing through the nip portion (bonding nip) of the heat roller 32*b* and the pressure roller 32*a*.

The sheet P folded by the folding device 31 is bonded in the folded state by undergoing a bonding process (second heat fixing to the image surface coated with the powder adhesive Tn) by the second fixing unit 32. That is, when the sheet P passes through the bonding nip, the powder adhesive Tn on the sheet P is heated and pressurized in a remelted state, so as to adhere to the facing surface (in the folded state, the surface facing the image surface of the sheet P onto which the toner image of the powder adhesive Tn has been transferred). Then, when the powder adhesive Tn cools and hardens, the image surface and the facing surface of the sheet P are joined (bonded) using the powder adhesive Tn as an adhesive.

As shown in FIG. 3B, the sheet P that has undergone the bonding process by the second fixing unit 32 is discharged to the left side in the figure from the discharge port 32*c* (second discharge port) provided in the housing 39 of the post-processing unit 30. The sheet is then stored in the second discharge tray 35 (see FIG. 1) provided on the left side surface of the apparatus body 10. This completes the image forming operation when the sheet P is transported along the second route R2.

The joining location of the folded sheet P can be changed by the application pattern of the powder adhesive Tn on the sheet P. FIGS. 6A and 6B exemplify deliverables (output products of an image forming apparatus) having different application patterns of the powder adhesive Tn.

FIG. 6A is an example of a deliverable (half-bonded product) to be opened by a recipient. In the case of a pay slip

51 shown in FIG. 6A, the powder adhesive Tn is applied to the entire circumference 51*a* of the outer peripheral portion of one side of the sheet P, and the sheet P is bonded in a folded state at the central crease 51*b*.

FIG. 6B shows a bag (medicine bag) as an example of a deliverable (completely bonded deliverable) for applications that do not presuppose the opening. In this case, the powder adhesive Tn is applied to a U-shaped region 52*a* so that the three sides including the crease 52*b* of the folded sheet P are joined. Although no image is formed inside the bag in FIG. 6B, an image can be formed if necessary.

Further, the image forming apparatus 1 can output any of the deliverables illustrated in FIGS. 6A and 6B in a one-stop manner without preparing preprint paper. That is, it is possible to apply the powder adhesive Tn in a predetermined application pattern and output the deliverables subjected to folding process and bonding process in parallel with the operation of recording an image on one side or both sides of the sheet P by using the printing toner.

For example, when the deliverables of FIGS. 6A and 6B are output, one side of the sheet P used as the base paper is on the outside of the deliverable, and the other side is on the inside of the deliverable. Therefore, an image for the outer surface may be formed with the printing toner as an image forming operation on the first surface in double-sided printing, and an image for the inner surface may be formed with the printing toner and the powder adhesive Tn may be applied according to the predetermined application pattern as an image forming operation on the second surface.

The image recorded by the image forming apparatus 1 using the printing toner can include a format (unchanged portion) when using preprint paper and a variable portion such as personal information. Therefore, it is possible to output the deliverable bonded by the bonding process from the base paper such as blank paper which is not the preprinted paper as described above. However, the image forming apparatus 1 can also be used in applications in which the preprinted paper is used as a recording medium and the printing process and bonding process of the variable portion are performed.

Method for Producing a Bonded Product (Deliverable)

The method for producing a bonded product is a method for producing a bonded product resulting from bonding at least one sheet of paper via an adhesive portion by using the above electrophotographic developer set, wherein the bonded product has a surface A on which an adhesive portion of the powder adhesive is fixed, and a toner image portion of the toner is fixed, wherein the method comprises the following steps (A) and (B):

(A) forming the toner image portion and the adhesive portion on at least one surface of the surface A, and fixing the toner image portion and the adhesive portion by heating, and (B) forming the adhesive portion on one surface of the surface A and fixing the adhesive portion by heating, and forming the toner image portion on at least the other surface of the surface A and fixing the toner image portion by heating, and wherein the method comprises the following steps, after formation and fixation of the toner image portion and the adhesive portion, overlaying the paper so as to interpose the adhesive portion, and melting the adhesive portion thereby bonding the paper to obtain the bonded product.

The bonded product may be in the form obtained by folding and bonding one sheet of paper via an adhesive portion, or in the form obtained by bonding two sheets of paper via an adhesive portion. The bonded product has, for example, a bag-like or tubular form.

When paper is bonded via an adhesive portion, the surface A on which the adhesive portion is present will be present on two surfaces in the bonded product, but the adhesive portion formed by the powder adhesive may be formed on at least one of the two surfaces.

For instance, an image portion and an adhesive portion are formed on at least one of the surfaces of the paper that constitutes the surface A, as in step (A). An adhesive portion is formed on one of the surfaces of the paper that constitutes the surface A while an image portion is formed on the other surface, as in step (B).

In a case where the bonded product is produced from a single sheet of paper, the toner image portion of toner and the adhesive portion of the powder adhesive may be formed on at least one of the surfaces of the paper. A toner image portion may or may not be formed on the other surface of the paper.

In a case where two sheets of paper are bonded together to produce a bonded product, a toner image portion and an adhesive portion may be formed on the surface of one of the paper sheets constituting the surface A, in step (A). A toner image portion or an adhesive portion may or may not be formed on the other paper sheet.

In a case where a bonded product is produced through bonding of two sheets of paper, an adhesive portion is formed on the surface of one of the paper sheets constituting the surface A, and the toner image portion is formed on the surface of the other paper sheet constituting the surface A, in step (B).

Either the toner image portion or the adhesive portion may be formed first; alternatively, both the toner image portion and the adhesive portion may be formed simultaneously. Forming and fixing of the image portion and forming and fixing of the adhesive portion can be performed for instance using the above-described image forming apparatus. A known electrophotographic method can be resorted to.

After the toner image portion and the adhesive portion have been formed, in the case of one sheet of paper, the paper is folded to sandwich the adhesive portion, and in the case of two sheets of paper, these are stacked to sandwich the adhesive portion. Then, the paper is bonded by heating to melt the adhesive portion, and a bonded product (deliverable) is obtained. Such a bonding step can be performed by using, for example, the above-mentioned image forming apparatus or sheet processing device.

Methods for measuring physical properties are described hereinbelow.

Method for Identifying the Molecular Structure of Thermoplastic Resins and Waxes, and Measuring the Content Na of Wax in the Toner, the Content Nb of Wax in the Powder Adhesive, and the Content of Thermoplastic Resin in the Powder Adhesive or the Toner A pyrolysis-gas chromatography mass spectrometer (hereafter pyrolysis GC/MS) and NMR are used for identification of the molecular structure of the thermoplastic resins and waxes, and for measurement of the content Na of wax in the toner, and the content Nb of wax in the powder adhesive.

In pyrolysis GC/MS, it is possible to determine the monomers that make up the total amount of resin in a sample and determine the peak area of each monomer, but for quantification, the peak intensity of a sample with a known concentration as a reference needs to be standardized. Meanwhile, in NMR, it is possible to determine and quantify the constituent monomers without using a sample having a known concentration.

Therefore, depending on the situation, the constituent monomers are determined by comparing the spectra of both NMR and pyrolysis GC/MS.

Specifically, when the amount of the resin component insoluble in deuterated chloroform, which is an extraction solvent at the time of NMR measurement, is less than 5.0% by mass, quantification is performed by NMR measurement.

Meanwhile, when the resin component insoluble in deuterated chloroform, which is an extraction solvent at the time of NMR measurement, is present in an amount of 5.0% by mass or more, NMR and pyrolysis GC/MS measurements are performed, and pyrolysis GC/MS measurement is performed for deuterated chloroform insoluble matter.

In this case, first, NMR measurement is performed for deuterated chloroform soluble matter to determine and quantify the constituent monomers (quantification result 1). Next, pyrolysis GC/MS measurement is performed on the deuterated chloroform soluble matter, and the peak area of the peak attributed to each constituent monomer is determined. Using the quantification result 1 obtained by NMR measurement, the relationship between the amount of each constituent monomer and the peak area of pyrolysis GC/MS is determined.

Next, pyrolysis GC/MS measurement of deuterated chloroform insoluble matter is performed, and the peak area of the peak attributed to each constituent monomer is determined. Based on the relationship between the amount of each constituent monomer obtained by measuring the deuterated chloroform soluble matter and the peak area of pyrolysis GC/MS, the constituent monomer in deuterated chloroform insoluble matter is quantified (quantification result 2).

Then, the quantification result 1 and the quantification result 2 are combined to obtain the final quantification result of each constituent monomer. Specifically, the following operations are performed.

(1) A total of 50 mg of toner or powder adhesive is precisely weighed in an 8 mL glass sample bottle, 1 mL of deuterated chloroform is added, a lid is closed, and the components is dispersed and dissolved by an ultrasonic disperser for 1 h. Then, filtration is performed with a membrane filter having a pore diameter of 0.4 μm and the filtrate is collected. At this time, the deuterated chloroform insoluble matter remains on the membrane filter.

(2) $^1$H-NMR measurement is performed on the filtrate, and the spectrum is attributed to each constituent monomer in the resin to obtain a quantitative value.

(3) Where the deuterated chloroform insoluble matter needs to be analyzed, it is analyzed by pyrolysis GC/MS. If necessary, derivatization treatment such as methylation is performed.

NMR Measurement Conditions

Bruker AVANCE 500 manufactured by Bruker Biospin Co., Ltd.

Measurement nucleus: $^1$H.

Measurement frequency: 500.1 MHz.

Accumulation number: 16 times.

Measurement temperature: room temperature.

Measurement Conditions for Pyrolysis GC/MS

Pyrolysis device: TPS-700 manufactured by Nippon Analytical Industry Co., Ltd.

Pyrolysis temperature: appropriate value from 400° C. to 600° C.

GC/MS device: ISQ manufactured by Thermo Fisher Scientific Co., Ltd.

Column: "HP5-MS" (Agilent/190915-433), length 30 m, inner diameter 0.25 mm, membrane thickness 0.25 μm.

GC/MS conditions.

Inlet conditions:

InletTemp: 250° C.

SpiritFlow: 50 mL/min.

GC temperature rise condition: 40° C. (5 min)→10° C./min (300° C.)→300° C. (20 min).

Method for Calculating Ester Group Concentration of a Wax

In the present disclosure the ester group concentration is defined as the number of ester groups (mmol/g) contained in a wax per molecular weight. The ester group concentrations Ea and Eb in the wax are calculated on the basis of the molecular structure of the wax, obtained in accordance with the above measurements, and the content of the wax in the toner and the powder adhesive.

The ester group concentration Ea of wax contained in the toner is calculated as $$Ea=1000\times aa/na \text{ (mmol/g)},$$

where na (g/mol) denotes the molecular weight, obtained on the basis of the molecular structure, of the wax contained in the toner, and aa (mol) denotes the number of ester groups per molecule of the wax contained in the toner.

Similarly, the ester group concentration Eb of wax contained in the powder adhesive is calculated as $$Eb=1000\times ab/nb \text{ (mmol/g)},$$

where nb (g/mol) denotes the molecular weight, obtained on the basis of the molecular structure, of the wax contained in the powder adhesive, and ab (mol) denotes the number of ester groups per molecule in the wax contained in the powder adhesive.

Further, Ea and Eb for a case where a plurality of waxes is present are calculated as average values resulting from multiplying respective contents as coefficients as follows.

In a case for instance where there are present three types of wax, namely waxes 1 to 3, Ea is calculated in accordance with the formula below, where Ea1 denotes the ester group concentration and Na1 the content of wax 1, Ea2 denotes the ester group concentration and Na2 the content of wax 2, and Ea3 denotes the ester group concentration and Na3 the content of wax 3.

$$Ea=Ea1\times(Na1/(Na1+Na2+Na3))+Ea2\times(Na2/(Na1+Na2+Na3))+Ea3\times(Na3/(Na1+Na2+Na3))$$

In this case the number of waxes that may be used simultaneously is not limited. Also, Eb is calculated similarly to the above formula.

Method for Calculating the Ester Group Concentration of a Thermoplastic Resin

Where Ec denotes the ester group concentration of a thermoplastic resin, Ec is calculated on the basis of the molecular structure and mass ratio of the constituent monomers for the thermoplastic resin, obtained in the above measurement.

The ester group concentration Ec of the thermoplastic resin is given by $$Ec=1000\times ac/nc \text{ (mmol/g)},$$

where nc (g/mol) denotes the molecular weight of the monomer from which the structure that makes up the thermoplastic resin is derived, and ac (mol) denotes the number of ester groups contained in one molecule of the monomer.

In a case where the thermoplastic resin is composed of a plurality of monomers, the ester group concentration is similarly determined for each monomer.

From the ester group concentration of each monomer and the respective content (mass %) of the structure derived from each monomer in the thermoplastic resin, the ester group concentration is calculated by multiplying respective contents as respective coefficients as follows.

For instance, Ec for a thermoplastic resin made up of a structure derived from three types of monomer, namely monomers 1 through 3, is calculated on the basis of the formula below, where Ec1 is the ester group concentration and Nc1 the constituent ratio (mass % in the thermoplastic resin) of monomer 1, Ec2 is the ester group concentration and Nc2 the constituent ratio of monomer 2, and Ec3 is the ester group concentration and Nc3 the constituent ratio of monomer 3.

$$Ec=Ec1\times(Nc1/(Nc1+Nc2+Nc3))+Ec2\times(Nc2/(Nc1+Nc2+Nc3))+Ec3\times(Nc3/(Nc1+Nc2+Nc3))$$

The number of monomers that may be used simultaneously in this case is not limited.

In a case where the thermoplastic resin contains a plurality of resins, the ester group concentration is calculated as an average value obtained by multiplying contents (mass %) as respective coefficients, similarly to the calculation example of ester group concentration of a wax.

Method for Measuring Glass Transition Temperature (Tg)

The glass transition temperature (Tg) of the thermoplastic resin and so on is measured using a differential scanning calorimeter "Q1000" (manufactured by TA Instruments). The melting points of indium and zinc are used for temperature correction of the device detector, and the heat of fusion of indium is used for the correction of calorific value.

Specifically, 1 mg of the sample is precisely weighed, placed in an aluminum pan, and an empty aluminum pan is used as a reference. Using a modulation measurement mode, the measurement is performed in the range of 0° C. to 100° C. at a temperature rise rate of 1° C./min and a temperature modulation condition of ±0.6° C./60 sec. Since the specific heat change is obtained in the temperature rise process, the intersection of the line between the midpoint of a baseline from before to after the specific heat change and the differential thermal curve is defined as the glass transition temperature (Tg).

Method for Measuring Weight Average Particle Diameter (D4) of Powder Adhesive and Toner The weight-average particle diameter (D4) is calculated as follows.

A precision particle size distribution measurement device operating on the aperture impedance method and equipped with a 100 μm aperture tube "Coulter Counter Multisizer 3" (registered trademark, manufactured by Beckman Coulter Co., Ltd.) aperture impedance method is used as a measuring device. The attached dedicated software "Beckman Coulter Multisizer 3 Version 3.51" (manufactured by Beckman Coulter Co., Ltd.) is used for setting the measurement conditions and analyzing the measurement data. The measurement is performed with 25,000 effective measurement channels.

A solution obtained by dissolving special grade sodium chloride in ion-exchanged water to a concentration of 1.0%, for example, "ISOTON II" (manufactured by Beckman Coulter Co., Ltd.) can be used as an electrolytic aqueous solution to be used for the measurement.

The dedicated software is configured as follows prior to the measurement and analysis.

On the "Change Standard Measurement Method (SOMME)" screen of the dedicated software, the total count number in the control mode is set to 50,000 particles, the measurement number is set to 1, and the Kd value is set to a value obtained using "Standard Particles 10.0 μm" (manufactured by Beckman Coulter Co., Ltd.). The threshold and noise level are automatically set by pressing the "Threshold/Noise Level Measurement Button". Further, the current is set to 1,600 μA, the gain is set to 2, the electrolyte to ISOTON II, and a check is entered for "Flash the Aperture Tube After Measurement".

On the "Conversion Setting from Pulse to Particle Diameter" screen of the dedicated software, the bin interval is set to a logarithmic particle diameter, the particle diameter bins are set to 256 particle diameter bins, and the particle diameter range is set from 2 μm to 60 μm.

The specific measurement method is as follows.

(1) 200.0 mL of the electrolytic aqueous solution is placed in a 250 mL glass round-bottomed beaker dedicated to Multisizer 3, the beaker is set on a sample stand, and stirred counter-clockwise at a rate of 24 rotations per second of the stirrer rod. Then, contamination and air bubbles in the aperture tube are removed by the "Flash the Aperture Tube" function of the dedicated software.

(2) 30.0 mL of the electrolytic aqueous solution is placed in a 100 mL glass flat-bottomed beaker. 0.3 mL of a diluted solution obtained by three-fold by mass dilution of "CONTAMINON N" (a 10% aqueous solution of a pH 7 neutral detergent for cleaning precision measurement instruments, comprising a nonionic surfactant, an anionic surfactant, and an organic builder; manufactured by Wako Pure Chemical Industries, Ltd.) with ion-exchanged water is added thereto as a dispersant.

(3) An ultrasonic dispersing unit "Ultrasonic Dispersion System Tetora 150" (produced by Nikkaki Bios Co., Ltd.), which has an electrical output of 120 W and is equipped with two built-in oscillators with an oscillation frequency of 50 kHz disposed so that their phases are displaced by 180 degrees, is prepared. 3.3 L of ion-exchanged water is poured into the water tank of the ultrasonic dispersing unit, and 2.0 mL of the CONTAMINON N is added into the water tank.

(4) The beaker of (2) above is set in a beaker fixing hole of the ultrasonic dispersing unit, and the ultrasonic dispersing unit is operated. Then, the height position of the beaker is adjusted to maximize the resonance state of the surface of the aqueous electrolytic solution in the beaker.

(5) 10 mg of the measurement sample is added bit by bit and dispersed in the aqueous electrolytic solution in the beaker of (4) above while irradiating the aqueous electrolytic solution with ultrasonic waves. Then, the ultrasonic dispersion treatment is continued for another 60 seconds. During the ultrasonic dispersion, the temperature of water in the water tank is adjusted, as appropriate, to be from 10° C. to 40° C.

(6) The aqueous electrolytic solution of (5) above, in which the toner particles have been dispersed, is added dropwise with a pipette into the round-bottom beaker of (1) above placed in a sample stand, and the measurement concentration is adjusted to 5%. Measurements are performed until the number of measured particles reaches 50,000.

(7) The measurement data is analyzed with the dedicated software included with the device, and the weight-average particle diameter (D4) is calculated. The weight-average particle diameter (D4) is the "Average Diameter" on the "Analysis/Volumetric Statistical Value (Arithmetic Average)" screen when the dedicated software is set to graph/vol %.

Method for Measuring Molecular Weight Distribution and Peak Molecular Weight

A molecular weight distribution and peak molecular weight are measured by gel permeation chromatography (GPC), as follows.

First, the measurement sample is dissolved in tetrahydrofuran (THF). Then, the obtained solution is filtered through a solvent-resistant membrane filter "Myshori Disc" (manufactured by Tosoh Corporation) having a pore diameter of 0.2 μm to obtain a sample solution. The sample solution is adjusted so that the concentration of the fraction soluble in THF is 0.8% by mass. This sample solution is used for measurement under the following conditions.

Device: high-speed GPC device "HLC-8220 GPC" (by Tosoh Corporation)

Column: two columns LF-604 (by Showa Denko KK)

Eluent: THF

Flow velocity: 0.6 ml/min.

Oven temperature: 40° C.

Sample injection volume: 0.020 ml.

For calculating the molecular weight of the sample, a molecular weight calibration curve created using standard polystyrene resins (for example, trade name "TSK standard polystyrene F-850, F-450, F-288, F-128, F-80, F-40, F-20, F-10, F-4, F-2, F-1, A-5000, A-2500, A-1000, and A-500", manufactured by Tosoh Corporation) is used. From the obtained molecular weight distribution, the largest peak is used as the main peak, and the molecular weight value of this peak is used as the peak molecular weight.

Hereinafter, the present invention will be specifically described with reference to examples, but the present invention is not limited to these examples. In the examples, the parts are based on mass unless otherwise specified.

The composition and physical properties of the wax used for examples and comparative examples are shown in Table 1.

TABLE 1

| | Composition | Melting point Tm (° C.) | Molecular weight | Ester group concentration (mmol/g) |
|---|---|---|---|---|
| Wax 1 | Ethylene glycol distearate | 76 | 595 | 3.37 |
| Wax 2 | Hexanediol distearate | 63 | 651 | 3.08 |
| Wax 3 | Pentaerythritol tetrapalmitate | 63 | 1090 | 3.67 |
| Wax 4 | Dipentaerythritol hexapalmitate | 73 | 1685 | 3.56 |
| Wax 5 | Distearyl sebacate | 65 | 706 | 2.83 |
| Wax 6 | Ethylene glycol dibehenate | 83 | 706 | 2.83 |
| Wax 7 | HNP-9 | 78 | 490 | 0.00 |
| Wax 8 | Behenyl behenate | 73 | 649 | 1.54 |
| Wax 9 | Dibehenyl sebacate | 73 | 818 | 2.44 |

In the table, HNP-9 is a hydrocarbon wax produced by Nippon Seiro Co., Ltd. (having a peak carbon number of 33).

Production Example of a Polyester Resin

Into a reaction vessel equipped with a stirrer, a thermometer, a nitrogen introduction tube, a dewatering tube and a pressure-reducing device there were added 1.00 mol of terephthalic acid, 0.65 mol of a propylene oxide 2 mol adduct of bisphenol A, and 0.35 mol of ethylene glycol, in molar ratio, as monomers, with heating up to a temperature of 130° C. while under stirring. Thereafter, 0.52 parts of tin(II) 2-ethylhexanoate as an esterification catalyst were added to 100.00 parts of the above monomers, the temperature was raised to 200° C., and condensation polymerization was carried out up to a desired molecular weight.

Further, 3.00 parts of trimellitic anhydride were added to 100.00 parts of the above monomer mixture, to obtain a polyester resin.

The obtained polyester resin had a peak molecular weight of 12,000, a glass transition temperature (Tg) of 75° C., an acid value of 8.2 mgKOH/g, and an ester group concentration of 5.41 mmol/g.

Production Example of Powder Adhesive 1

Styrene: 75.0 parts n-butyl acrylate: 25.0 parts

Polyester resin: 4.0 parts

Wax 1: 14.0 parts

Wax 7: 2.0 parts

Divinylbenzene: 0.5 parts

A mixture resulting from mixing the above materials was kept at 60° C., and was stirred at 500 rpm using T. K. Homomixer (by Tokushu Kika Kogyo Co., Ltd.), to elicit uniform dissolution and prepare a polymerizable monomer composition.

Meanwhile, 850.0 parts of a 0.10 mol/L-$Na_3PO_4$ aqueous solution and 8.0 parts of 10% hydrochloric acid were added into a vessel provided with a high-speed stirring device CLEARMIX (by M Technique Co. Ltd.), the revolutions were adjusted to 15,000 rpm, and the temperature was raised to 70° C. Then 127.5 parts of a 1.0 mol/L-$CaCl_2$) aqueous solution were added thereto, to prepare an aqueous medium that contained a calcium phosphate compound.

The above polymerizable monomer composition was charged into the aqueous medium, followed by addition of 7.0 parts of t-butyl peroxypivalate as a polymerization initiator, and granulation for 10 minutes while keeping revolutions at 15,000 rpm/min. Thereafter, the stirrer was changed from a high-speed stirrer to a propeller stirring blade, and the reaction was carried out at 70° C. for 5 hours while under reflux, after which the liquid temperature was adjusted to 85° C., and the reaction was left to proceed for a further 2 hours.

Once the polymerization reaction was over, the obtained slurry was cooled, and hydrochloric acid was further added to the slurry to adjust the pH to 1.4, whereupon the mixture was stirred for 1 hour to thereby dissolve a calcium phosphate salt.

Thereafter, the slurry was washed with water in an amount of thrice the amount of the slurry, with filtration and drying, followed by classifying to yield powder adhesive particles.

Thereafter, 2.0 parts of silica fine particles (number-average particle diameter of primary particles: 10 nm; BET specific surface area: 170 $m^2/g$) having undergone a hydrophobic treatment using dimethyl silicone oil (20 mass %) were added, as an external additive, to 100.0 parts of the powder adhesive particles, and the whole was mixed using a Mitsui Henschel mixer (by Mitsui Miike Engineering Corporation), at 3,000 rpm for 15 minutes, to yield Powder adhesive 1.

Production Examples of Powder Adhesives 2 to 13 and 15 to 18

Powder adhesives 2 to 13 and 15 to 18 were obtained in the same way as in the production example of Powder adhesive 1, except that the type and addition amount of the waxes were changed as shown in Table 2.

TABLE 2

| | Type 1 | | | Type 2 | | |
|---|---|---|---|---|---|---|
| | No. | Composition | Addition amount (parts) | No. | Composition | Addition amount (parts) |
| Powder adhesive 1 | Wax 1 | Ethylene glycol distearate | 14.0 | Wax 7 | HNP-9 | 2.0 |
| Powder adhesive 2 | Wax 1 | Ethylene glycol distearate | 12.0 | Wax 7 | HNP-9 | 4.0 |
| Powder adhesive 3 | Wax 1 | Ethylene glycol distearate | 15.0 | Wax 7 | HNP-9 | 1.0 |
| Powder adhesive 4 | Wax 1 | Ethylene glycol distearate | 16.0 | — | — | — |
| Powder adhesive 5 | Wax 2 | Hexanediol distearate | 15.0 | Wax 7 | HNP-9 | 1.0 |
| Powder adhesive 6 | Wax 3 | Pentaerythritol tetrapalmitate | 15.0 | Wax 7 | HNP-9 | 1.0 |
| Powder adhesive 7 | Wax 4 | Dipentaerythritol hexapalmitate | 15.0 | Wax 7 | HNP-9 | 1.0 |
| Powder adhesive 8 | Wax 5 | Distearyl sebacate | 15.0 | Wax 7 | HNP-9 | 1.0 |
| Powder adhesive 9 | Wax 6 | Ethylene glycol dibehenate | 15.0 | Wax 7 | HNP-9 | 1.0 |
| Powder adhesive 10 | Wax 1 | Ethylene glycol distearate | 11.0 | Wax 7 | HNP-9 | 2.0 |
| Powder adhesive 11 | Wax 1 | Ethylene glycol distearate | 20.0 | Wax 7 | HNP-9 | 3.0 |
| Powder adhesive 12 | Wax 1 | Ethylene glycol distearate | 8.5 | Wax 7 | HNP-9 | 1.5 |
| Powder adhesive 13 | Wax 1 | Ethylene glycol distearate | 25.0 | Wax 7 | HNP-9 | 4.0 |
| Powder adhesive 15 | Wax 1 | Ethylene glycol distearate | 10.0 | Wax 7 | HNP-9 | 5.0 |
| Powder adhesive 16 | Wax 3 | Pentaerythritol tetrapalmitate | 16.0 | — | — | — |
| Powder adhesive 17 | Wax 1 | Ethylene glycol distearate | 7.5 | Wax 7 | HNP-9 | 1.5 |
| Powder adhesive 18 | | EVA | 14.0 | — | — | — |

In the table, EVA denotes an ethylene-vinyl acetate copolymer resin (ULTRASEN 685, by Tosoh Corporation).

Production Example of Powder Adhesive 14

Polyester resin: 100.0 parts

Wax 1: 14.0 parts

Wax 7: 2.0 parts

The above materials were premixed in a Henschel mixer (by Nippon Coke & Engineering Co., Ltd.) and were then melt-kneaded in a twin-screw kneading extruder (by Ikegai Corp.: model PCM-30).

The obtained kneaded product was cooled, coarsely pulverized using a hammer mill, and then pulverized using a mechanical crusher (T-250, by Turbo Kogyo Co., Ltd.); the obtained finely pulverized powder was classified using a multi-grade classifier relying on the Coanda effect, to yield powder adhesive particles having a weight-average particle diameter (D4) of 5.8 μm.

Thereafter, 2.0 parts of silica fine particles (number-average particle diameter of primary particles: 10 nm; BET specific surface area: 170 $m^2/g$) having undergone a hydrophobic treatment using dimethyl silicone oil (20 mass %) were added, as an external additive, to 100.0 parts of the powder adhesive particles, and the whole was mixed using a Mitsui Henschel mixer (by Mitsui Miike Engineering Corporation) at 3,000 rpm for 15 minutes to yield Powder adhesive 14.

Production Example of Powder Adhesive 19

Topas TM (cyclic polyolefin resin by Ticona Inc.) 39.8 parts

Topas TB (cyclic polyolefin resin by Ticona Inc.) 18.5 parts

Arkon P-100 (by Arakawa Chemical Industries Ltd., alicyclic saturated hydrocarbon resin) 30.0 parts Quintac SL-125 (by Zeon Corporation, thermoplastic elastomer) 6.5 parts The above materials were premixed in a Henschel mixer (by Nippon Coke & Engineering Co., Ltd.) and were then melt-kneaded in a twin-screw kneading extruder (by Ikegai Corp.: model PCM-30).

The obtained kneaded product was cooled, coarsely pulverized using a hammer mill, and then pulverized using a mechanical crusher (T-250, by Turbo Kogyo Co., Ltd.); the obtained finely pulverized powder was classified using a multi-grade classifier relying on the Coanda effect, to yield powder adhesive particles having a weight-average particle diameter (D4) of 9.0 μm.

Thereafter, 2.0 parts of silica fine particles (number-average particle diameter of primary particles: 10 nm; BET specific surface area: 170 $m^2/g$) having undergone a hydrophobic treatment using dimethyl silicone oil (20 mass %) were added, as an external additive, to 100.0 parts of the powder adhesive particles, and the whole was mixed using a Mitsui Henschel mixer (by Mitsui Miike Engineering Corporation) at 3,000 rpm for 15 minutes to yield Powder adhesive 19.

Production Example of Powder Adhesive 20

Preparation of a Core Resin Particle Dispersion Liquid

Styrene: 450 parts 2-ethylhexyl acrylate: 135 parts

Acrylic acid: 12 parts

Dodecanethiol: 9 parts

The above components were mixed and dissolved to prepare a solution.

Meanwhile, 10 parts of an anionic surfactant (DOWFAX 2A1 by The Dow Chemical Company) were dissolved in 250 parts of ion-exchanged water, and the above solution was then added, with dispersion and emulsification in a flask (monomer emulsion A).

Further, 1 part of the anionic surfactant (DOWFAX 2A1 by The Dow Chemical Company) was similarly dissolved in 555 parts of ion-exchanged water, and the resulting solution was placed in a polymerization flask.

A reflux tube was set in the polymerization flask, and the polymerization flask was heated in a water bath up to 75° C. and held at that temperature, while under slow stirring and under injection of nitrogen.

Then a solution resulting from dissolving 9 parts of ammonium persulfate in 43 parts of ion-exchanged water was added dropwise over 20 minutes into the polymerization flask via a metering pump, followed by dropwise addition of the monomer emulsion A over 200 minutes via a metering pump.

Thereafter, the polymerization flask was held at 75° C. for 3 hours while under continued stirring, and first-stage polymerization was terminated. As a result, there was obtained a core resin particle dispersion liquid precursor having a volume-average particle diameter of 190 nm, a glass transition temperature of 53° C. and a weight-average molecular weight of 33,000.

Next, the temperature was lowered to room temperature, and thereafter 600 parts of 2-ethylhexyl acrylate and 850 parts of ion-exchanged water were added to the polymerization flask, with slow stirring for 2 hours. Thereafter, the temperature was raised to 70° C. while under continued stirring, and 4.5 parts of ammonium persulfate and 110 parts of ion-exchanged water were added dropwise over 20 minutes via a metering pump. Thereafter, the polymerization flask was held for 3 hours while under continued stirring, and polymerization was terminated.

As a result of the above process, there was obtained a core resin particle dispersion liquid having a volume-average particle diameter of 260 nm, a weight-average molecular weight of 200,000, and solid component amount of 33 mass %.

Preparation of a Shell Resin Particle Dispersion Liquid

Styrene: 450 parts n-butyl acrylate: 135 parts

Allyl methacrylate: 18 parts

Acrylic acid: 12 parts

Dodecanethiol: 9 parts

The above components were mixed and dissolved to prepare a solution.

Meanwhile, 10 parts of an anionic surfactant (DOWFAX 2A1 by The Dow Chemical Company) were dissolved in 250 parts of ion-exchanged water, and the above solution was then added, with dispersion and emulsification in a flask (monomer emulsion A).

Further, 1 part of the anionic surfactant (DOWFAX 2A1 by The Dow Chemical Company) was similarly dissolved in 555 parts of ion-exchanged water, and the resulting solution was placed in a polymerization flask.

A reflux tube was set in the polymerization flask, and the polymerization flask was heated in a water bath up to 75° C., and was held at that temperature, while under slow stirring and under injection of nitrogen.

Then a solution resulting from dissolving 9 parts of ammonium persulfate in 43 parts of ion-exchanged water was added dropwise over 20 minutes into the polymerization flask via a metering pump, followed by dropwise addition of the monomer emulsion A over 200 minutes via a metering pump.

Thereafter, the polymerization flask was held at 75° C. for 3 hours while under continued stirring, and first-stage polymerization was terminated. As a result, there was obtained a shell resin particle dispersion liquid having a volume-average particle diameter of 190 nm, a glass transition temperature of 53° C., a weight-average molecular weight of 33,000, and solid component amount of 42 mass %.

Production of a Powder Adhesive

Core resin particle dispersion liquid: 504 parts

Ion-exchanged water: 710 parts

Anionic surfactant: 1 part (DOWFAX 2A1, by The Dow Chemical Company)

The above components, as a core forming material, were charged into a 3 L reaction vessel equipped with a thermometer, a pH meter and a stirrer, and the pH was adjusted to 3.0 by addition of 1.0% nitric acid at a temperature of 25° C.; thereafter, 23 parts of a prepared aqueous solution of aluminum sulfate were added to be dispersed for 6 minutes while under dispersing at 5,000 rpm using a homogenizer (Ultra-Turrax T50, by IKA Japan K.K.).

Thereafter, a stirrer and a mantle heater were set in the reaction vessel, and the vessel was heated while under stirring. Once the volume-average particle diameter reached 5.0 μm, the temperature was maintained, and 170 parts of the shell resin particle dispersion liquid as a shell forming material were charged into the reaction vessel. After holding for 30 minutes, pH was adjusted to 9.0 using a 1% aqueous solution of sodium hydroxide. Thereafter the temperature was raised to 90° C., and the vessel was held at 98° C. After holding for 10.0 hours, the vessel was cooled down to 30° C. using cooling water. Thereafter, the slurry was washed with water in an amount of thrice the amount of the slurry, with filtration and drying, followed by classifying to yield powder adhesive particles having a weight-average particle diameter (D4) of 5.9 μm.

Thereafter, 2.0 parts of silica fine particles (number-average particle diameter of primary particles: 10 nm; BET specific surface area: 170 $m^2/g$) having undergone a hydrophobic treatment using dimethyl silicone oil (20 mass %) were added, as an external additive, to 100.0 parts of the powder adhesive particles, and the whole was mixed using a Mitsui Henschel mixer (by Mitsui Miike Engineering Corporation) at 3,000 rpm for 15 minutes to yield Powder adhesive 20.

The physical characteristics of the obtained Powder adhesives 1 to 20 were measured in accordance with the above methods. The results are given in Table 3.

TABLE 3

| | Eb (mmol/g) | Nb (mass %) | Ec (mmol/g) | Tg (° C.) | D4 (μm) | Peak molecular weight | Thermoplastic resin content (mass %) | Nb1 (mass %) | Nb2 (mass %) | Nb1/Nb2 |
|---|---|---|---|---|---|---|---|---|---|---|
| Powder adhesive 1 | 2.92 | 12.0 | 1.95 | 51 | 6.8 | 19000 | 88 | 10.4 | 1.6 | 6.50 |
| Powder adhesive 2 | 2.53 | 12.0 | 1.95 | 53 | 6.8 | 19000 | 88 | 9.0 | 3.0 | 3.00 |
| Powder adhesive 3 | 3.23 | 12.0 | 1.95 | 54 | 6.4 | 19000 | 88 | 11.5 | 0.5 | 23.00 |
| Powder adhesive 4 | 3.37 | 12.0 | 1.95 | 49 | 6.3 | 18000 | 88 | 12.0 | 0.0 | — |
| Powder adhesive 5 | 2.95 | 12.0 | 1.95 | 52 | 7.0 | 19000 | 88 | 0.0 | 0.5 | — |
| Powder adhesive 6 | 3.52 | 12.0 | 1.95 | 56 | 7.5 | 22000 | 88 | 0.0 | 0.5 | — |
| Powder adhesive 7 | 3.41 | 12.0 | 1.95 | 56 | 7.8 | 24000 | 88 | 0.0 | 0.5 | — |
| Powder adhesive 8 | 2.71 | 12.0 | 1.95 | 52 | 6.5 | 19000 | 88 | 0.0 | 0.5 | — |
| Powder adhesive 9 | 2.71 | 12.0 | 1.95 | 56 | 6.9 | 18000 | 88 | 11.5 | 0.5 | 23.00 |
| Powder adhesive 10 | 2.93 | 10.0 | 1.95 | 51 | 6.8 | 21000 | 90 | 8.7 | 1.3 | 6.69 |
| Powder adhesive 11 | 2.91 | 17.0 | 1.95 | 51 | 6.8 | 18000 | 83 | 14.7 | 2.3 | 6.39 |
| Powder adhesive 12 | 2.91 | 8.0 | 1.95 | 56 | 5.6 | 22000 | 92 | 6.9 | 1.1 | 6.27 |
| Powder adhesive 13 | 2.92 | 20.0 | 1.95 | 53 | 7.9 | 18000 | 80 | 17.3 | 2.7 | 6.41 |

TABLE 3-continued

| | Eb (mmol/g) | Nb (mass %) | Ec (mmol/g) | Tg (° C.) | D4 (μm) | Peak molecular weight | Thermoplastic resin content (mass %) | Nb1 (mass %) | Nb2 (mass %) | Nb1/Nb2 |
|---|---|---|---|---|---|---|---|---|---|---|
| Powder adhesive 14 | 2.92 | 12.0 | 5.08 | 59 | 5.8 | 12000 | 88 | 10.4 | 1.6 | 6.50 |
| Powder adhesive 15 | 2.25 | 12.0 | 1.95 | 55 | 6.8 | 19000 | 88 | 8.0 | 4.0 | 2.00 |
| Powder adhesive 16 | 3.72 | 12.0 | 1.95 | 54 | 7.7 | 22000 | 88 | 12.0 | 0.0 | — |
| Powder adhesive 17 | 2.89 | 7.0 | 1.95 | 56 | 6.2 | 22000 | 93 | 6.0 | 1.0 | 6.00 |
| Powder adhesive 18 | — | 0.0 | 1.95 | 56 | 8.1 | 24000 | 90 | 0.0 | 0.0 | — |
| Powder adhesive 19 | — | 0.0 | 0.00 | 70 | 9.0 | 9000 | 99 | 0.0 | 0.0 | — |
| Powder adhesive 20 | — | 0.0 | 3.10 | 53 | 5.9 | 22000 | 99 | 0.0 | 0.0 | — |

Production Example of Toner 1

Styrene: 60.0 parts

Colorant: 6.5 parts (C. I. Pigment Blue 15:3, by Dainichiseika Color & Chemicals Mfg. Co., Ltd.)

The above materials were placed in an Attritor (by Mitsui Miike Engineering Corporation), and were dispersed at 220 rpm for 5 hours, using zirconia particles having a diameter of 1.7 mm, to yield a pigment dispersion liquid.

Styrene: 15.0 parts n-butyl acrylate: 25.0 parts

Polyester resin: 4.0 parts

Wax 8: 12.0 parts

Divinylbenzene: 0.5 parts

The above materials were mixed and added to the pigment dispersion liquid. The obtained mixture was kept at 60° C., and was stirred at 500 rpm using T. K. Homomixer (by Tokushu Kika Kogyo Co., Ltd.), to elicit uniform dissolution, and prepare a polymerizable monomer composition.

Meanwhile, 850.0 parts of a 0.10 mol/L-$Na_3PO_4$ aqueous solution and 8.0 parts of 10% hydrochloric acid were added into a vessel provided with a high-speed stirring device CLEARMIX (by M Technique Co. Ltd.), the revolutions were adjusted to 15,000 rpm, and the temperature was raised to 70° C. Then 127.5 parts of a 1.0 mol/L-$CaCl_2$) aqueous solution were added thereto to prepare an aqueous medium that contained a calcium phosphate compound.

The above polymerizable monomer composition was charged into the aqueous medium, followed by addition of 7.0 parts of t-butyl peroxypivalate as a polymerization initiator, and granulation for 10 minutes while keeping revolutions at 15,000 rpm. Thereafter, the stirrer was changed from a high-speed stirrer to a propeller stirring blade, and the reaction was carried out at 70° C. for 5 hours while under reflux, after which the liquid temperature was adjusted to 85° C., and the reaction was left to proceed for a further 2 hours.

Once the polymerization reaction was over, the obtained slurry was cooled, and hydrochloric acid was further added to the slurry to adjust the pH to 1.4, whereupon the mixture was stirred for 1 hour to thereby dissolve a calcium phosphate salt.

Thereafter, the slurry was washed with water in an amount of thrice the amount of the slurry, with filtration and drying, followed by classifying to yield a toner particle.

Thereafter, 2.0 parts of silica fine particles (number-average particle diameter of primary particles: 10 nm; BET specific surface area: 170 $m^2/g$) having undergone a hydrophobic treatment using dimethyl silicone oil (20 mass %) were added, as an external additive, to 100.0 parts of the toner particle, and the whole was mixed using a Mitsui Henschel mixer (by Mitsui Miike Engineering Corporation) at 3,000 rpm for 15 minutes to yield Toner 1.

Production Example of Toners 2 to 11

Toners 2 to 11 were obtained in the same way as in the production example of Toner 1, except that the type and addition amount of the wax were changed, as shown in Table 4.

TABLE 4

| | Type 1 | | | Type 2 | | |
|---|---|---|---|---|---|---|
| | No. | Composition | Addition amount (parts) | No. | Composition | Addition amount (parts) |
| Toner 1 | Wax 8 | Behenyl behenate | 12.0 | — | — | — |
| Toner 2 | Wax 7 | HNP-9 | 12.0 | — | — | — |
| Toner 3 | Wax 9 | Dibehenyl sebacate | 12.0 | — | — | — |
| Toner 4 | Wax 8 | Behenyl behenate | 7.0 | Wax 7 | HNP-9 | 5.0 |
| Toner 5 | Wax 9 | Dibehenyl sebacate | 7.0 | Wax 7 | HNP-9 | 5.0 |
| Toner 6 | Wax 1 | Ethylene glycol distearate | 7.0 | Wax 7 | HNP-9 | 5.0 |
| Toner 7 | Wax 9 | Dibehenyl sebacate | 5.0 | Wax 7 | HNP-9 | 1.0 |
| Toner 8 | Wax 9 | Dibehenyl sebacate | 10.5 | Wax 7 | HNP-9 | 2.2 |
| Toner 9 | Wax 8 | Behenyl behenate | 2.5 | — | — | — |
| Toner 10 | Wax 8 | Behenyl behenate | 22.0 | — | — | — |
| Toner 11 | Wax 1 | Ethylene glycol distearate | 9.0 | Wax 7 | HNP-9 | 3.0 |

The physical characteristics of the obtained Toners 1 to 11 were measured in accordance with the above methods. The results are given in Table 5.

TABLE 5

| | Ea (mmol/g) | Na (mass %) | Ec (mmol/g) | Tg (° C.) | D4 (μm) | Peak molecular weight | Thermoplastic resin content (mass %) |
|---|---|---|---|---|---|---|---|
| Toner 1 | 1.54 | 9.0 | 1.95 | 52 | 6.5 | 21000 | 85 |
| Toner 2 | 0.00 | 9.0 | 1.95 | 55 | 6.9 | 23000 | 85 |
| Toner 3 | 2.44 | 9.0 | 1.95 | 49 | 6.4 | 21000 | 85 |
| Toner 4 | 0.86 | 9.0 | 1.95 | 54 | 6.7 | 21000 | 85 |
| Toner 5 | 1.36 | 9.0 | 1.95 | 53 | 6.7 | 21000 | 85 |
| Toner 6 | 1.87 | 9.0 | 1.95 | 53 | 6.0 | 18000 | 85 |
| Toner 7 | 1.95 | 5.0 | 1.95 | 55 | 6.2 | 23000 | 89 |
| Toner 8 | 1.90 | 10.0 | 1.95 | 54 | 7.2 | 20000 | 84 |
| Toner 9 | 1.54 | 2.0 | 1.95 | 57 | 5.9 | 23000 | 92 |
| Toner 10 | 1.54 | 15.0 | 1.95 | 51 | 7.8 | 20000 | 79 |
| Toner 11 | 2.62 | 9.0 | 1.95 | 52 | 6.1 | 18000 | 85 |

Respective developer sets were prepared using the obtained powder adhesives and toners, in the combinations given in Table 6. Developer sets 1 to 22 were used as examples, and Developer sets 23 to 29 were used as comparative examples.

TABLE 6

| | | Toner | | | Powder adhesive | | | Developer | |
|---|---|---|---|---|---|---|---|---|---|
| | | Number | Ea | Na | Number | Eb | Nb | Eb − Ea | Nb/Na |
| Example 1 | Developer set 1 | 1 | 1.54 | 9.0 | 1 | 2.92 | 12.0 | 1.38 | 1.33 |
| Example 2 | Developer set 2 | 1 | 1.54 | 9.0 | 2 | 2.53 | 12.0 | 0.99 | 1.33 |
| Example 3 | Developer set 3 | 1 | 1.54 | 9.0 | 3 | 3.23 | 12.0 | 1.69 | 1.33 |
| Example 4 | Developer set 4 | 1 | 1.54 | 9.0 | 4 | 3.37 | 12.0 | 1.83 | 1.33 |
| Example 5 | Developer set 5 | 1 | 1.54 | 9.0 | 5 | 2.95 | 12.0 | 1.41 | 1.33 |
| Example 6 | Developer set 6 | 1 | 1.54 | 9.0 | 6 | 3.52 | 12.0 | 1.98 | 1.33 |
| Example 7 | Developer set 7 | 1 | 1.54 | 9.0 | 7 | 3.41 | 12.0 | 1.87 | 1.33 |
| Example 8 | Developer set 8 | 1 | 1.54 | 9.0 | 8 | 2.71 | 12.0 | 1.17 | 1.33 |
| Example 9 | Developer set 9 | 1 | 1.54 | 9.0 | 9 | 2.71 | 12.0 | 1.17 | 1.33 |
| Example 10 | Developer set 10 | 2 | 0.00 | 9.0 | 4 | 3.37 | 12.0 | 3.37 | 1.33 |
| Example 11 | Developer set 11 | 3 | 2.44 | 9.0 | 4 | 3.37 | 12.0 | 0.93 | 1.33 |
| Example 12 | Developer set 12 | 4 | 0.86 | 9.0 | 4 | 3.37 | 12.0 | 2.51 | 1.33 |
| Example 13 | Developer set 13 | 5 | 1.36 | 9.0 | 4 | 3.37 | 12.0 | 2.01 | 1.33 |
| Example 14 | Developer set 14 | 6 | 1.87 | 9.0 | 4 | 3.37 | 12.0 | 1.50 | 1.33 |
| Example 15 | Developer set 15 | 3 | 2.44 | 9.0 | 1 | 2.92 | 12.0 | 0.48 | 1.33 |
| Example 16 | Developer set 16 | 7 | 1.95 | 5.0 | 10 | 2.93 | 10.0 | 0.98 | 2.00 |
| Example 17 | Developer set 17 | 8 | 1.90 | 10.0 | 11 | 2.91 | 17.0 | 1.01 | 1.70 |
| Example 18 | Developer set 18 | 1 | 1.54 | 9.0 | 12 | 2.91 | 8.0 | 1.37 | 0.89 |
| Example 19 | Developer set 19 | 1 | 1.54 | 9.0 | 13 | 2.92 | 20.0 | 1.38 | 2.22 |
| Example 20 | Developer set 20 | 9 | 1.54 | 2.0 | 1 | 2.92 | 12.0 | 1.38 | 6.00 |
| Example 21 | Developer set 21 | 10 | 1.54 | 15.0 | 1 | 2.92 | 12.0 | 1.38 | 0.80 |
| Example 22 | Developer set 22 | 1 | 1.54 | 9.0 | 14 | 2.92 | 12.0 | 1.38 | 1.33 |
| Comparative example 1 | Developer set 23 | 1 | 1.54 | 9.0 | 15 | 2.25 | 12.0 | 0.71 | 1.33 |
| Comparative example 2 | Developer set 24 | 1 | 1.54 | 9.0 | 16 | 3.72 | 12.0 | 2.18 | 1.33 |
| Comparative example 3 | Developer set 25 | 11 | 2.62 | 9.0 | 1 | 2.92 | 12.0 | 0.30 | 1.33 |
| Comparative example 4 | Developer set 26 | 1 | 1.54 | 9.0 | 17 | 2.89 | 7.0 | 1.35 | 0.78 |
| Comparative example 5 | Developer set 27 | 2 | 0.00 | 9.0 | 18 | — | 0.0 | — | — |
| Comparative example 6 | Developer set 28 | 2 | 0.00 | 9.0 | 19 | — | 0.0 | — | — |
| Comparative example 7 | Developer set 29 | 2 | 0.00 | 9.0 | 20 | — | 0.0 | — | — |

The performance of the obtained Developer sets 1 to 29 was evaluated in accordance with the following methods. All evaluations were performed in a normal-temperature, normal-humidity environment (25° C./50% RH); the paper used was GFC-081 (81.0 g/m$^2$) (by Canon Marketing Japan Inc.). The results are given in Table 7.

Evaluation of Adhesive Strength and Print Transfer

A commercially available Canon laser beam printer LBP712Ci was used to prepare a sample image for evaluation. By changing the software, the printer was modified so that it could work even if all the cartridges were not set. In addition, the laid-on level of powder adhesive and the toner (mg/cm$^2$) could be adjusted arbitrarily.

The toner contained in the cyan cartridge of LBP712Ci was extracted, and the cartridge was filled with 150 g of the toner of each developer set and set in the cyan station. Further, the toner contained in the black cartridge was extracted, and the cartridge was filled with 150 g of the powder adhesive of each developer set, and set in the black station.

Figure 8:
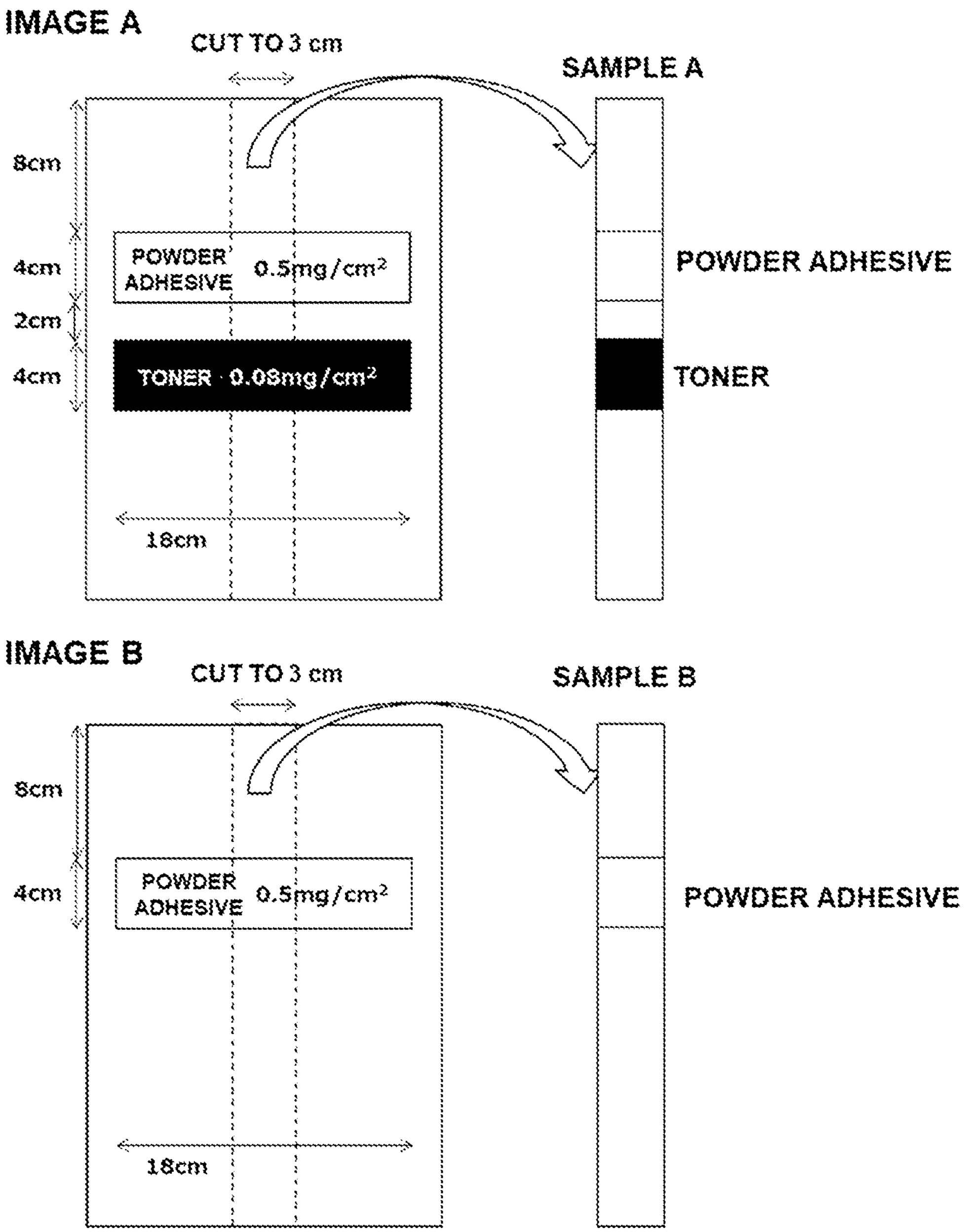
FIG. 8 is a schematic diagram of an evaluation sample.

Using this printer, as illustrated in FIG. 8, the powder adhesive was printed at a laid-on level of 0.5 mg/cm$^2$ on a 4 cm area by opening a margin of 8 cm, and toner was further printed at a laid-on level of 0.08 mg/cm$^2$ on a 4 cm area by opening a margin of 2 cm (image A).

Further, the powder adhesive was printed at a laid-on level of 0.5 mg/cm$^2$ on a 4 cm area by opening a front end margin of 8 cm on another paper (image B).

The obtained image A was cut to a width of 3 cm to obtain sample A. Similarly, the image B was cut to obtain sample B.

Bonding of a Sample Image for Evaluation

Figure 9:
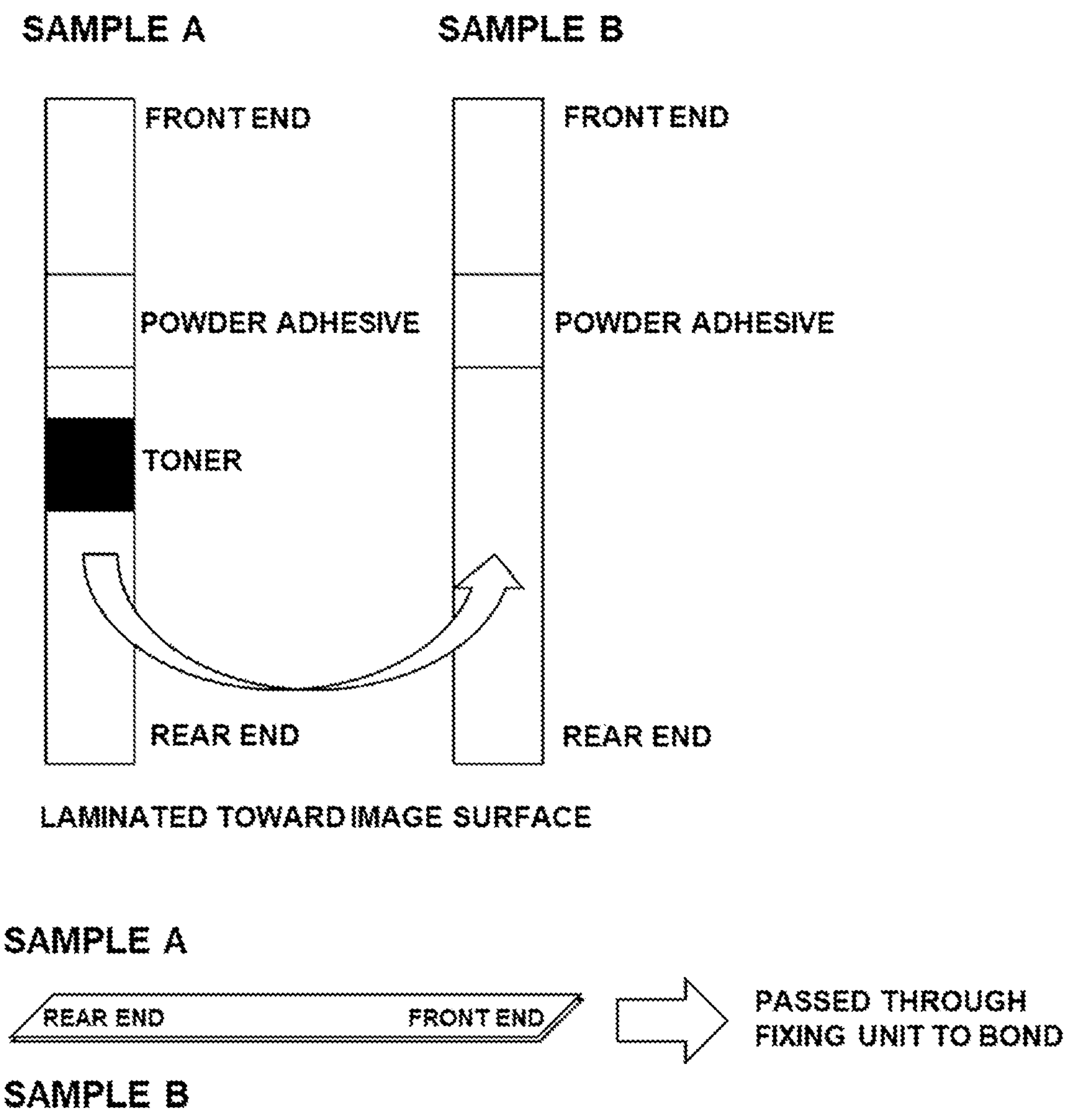
FIG. 9 is a schematic diagram of an evaluation sample.

As illustrated in FIG. 9, Sample A and Sample B were disposed opposing each other so that the image surface was facing inward, and the samples were bonded by being caused to pass through an external fixing unit removed from LBP712Ci, with the sample A side facing up.

Evaluation of Adhesive Strength

Figure 10:
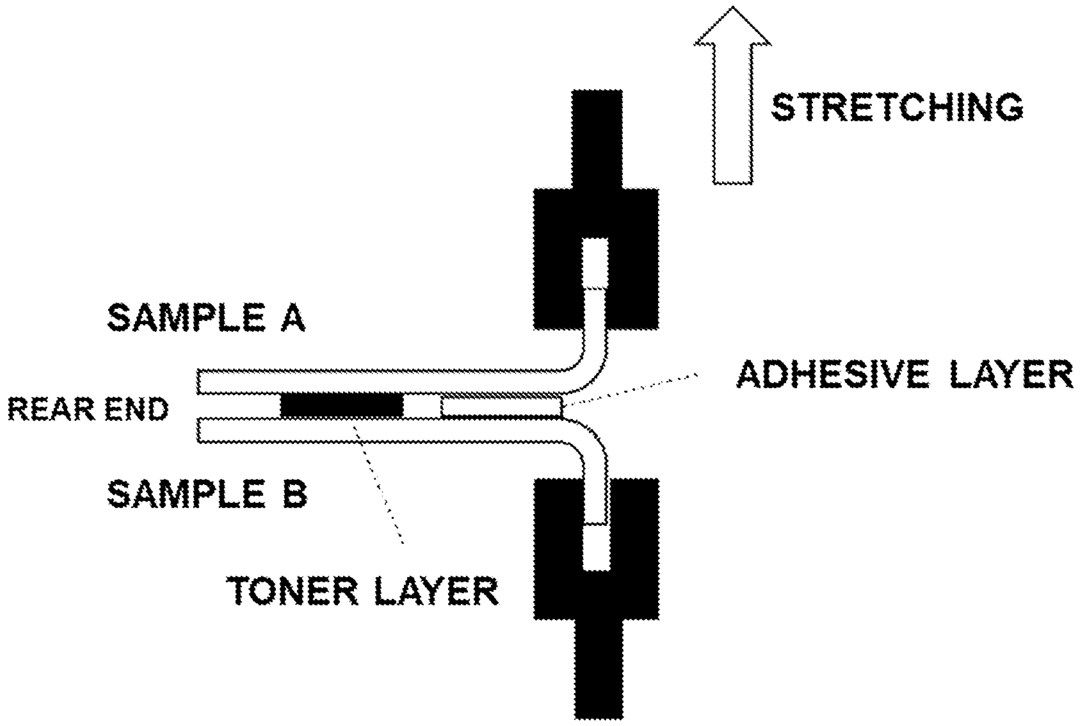
FIG. 10 is a schematic diagram of adhesive strength evaluation.

A Tencilon universal testing machine RTG-1225 (manufactured by A & D Co., Ltd.) was used to evaluate the adhesive strength. A parallel tightening type jaw was used as a jig, and the samples laminated as shown in FIG. 10 were set. A stress per 1 cm of width, which was obtained by multiplying the maximum value in a graph which was obtained when the evaluation sample image was peeled off under the condition of 50 mm/min and in which the distance (mm) was plotted against the abscissa and the stress ($N/cm^2$) was plotted against the ordinate by ⅓, was defined as the adhesive strength ($N/cm^2$). The larger this value, the better the adhesive strength.

Evaluation of Print Transfer

Each sample after peeling as described above was evaluated for print transfer through measurement of the density of the toner that migrated onto the paper side originally having no toner printed thereon. A reflectometer ("REFLECTOMETER MODEL TC-6DS" by Tokyo Denshoku Co., Ltd.) was used for measuring density. The reflectance Dr (%) of the print transfer portion and the reflectance Ds (%) of a white background portion of the paper were measured, and a calculation was performed in accordance with the formula below.

$$\text{Print transfer density }(\%)=Dr(\%)-Ds(\%)$$

The lower this value, the greater is the degree to which print transfer can be suppressed.

Evaluation of Durability

An image having image coverage of 1% was outputted in 15,000 prints, using a printer in which the above-mentioned toners and powder adhesives were set. After output of the image, the cartridge filled with the powder adhesive was taken out and disassembled, and the number of vertical streaks appearing on the developing roller was ascertained using an optical microscope. A smaller number of vertical streaks entails a lower likelihood of member contamination, and better durability.

TABLE 7

| | | Adhesive strength Stress ($N/cm^2$) | Print transfer Print transfer density (%) | Durability Number of streaks (streaks) |
|---|---|---|---|---|
| Example 1 | Developer set 1 | 1.2 | 0.0 | 0 |
| Example 2 | Developer set 2 | 0.8 | 0.0 | 0 |
| Example 3 | Developer set 3 | 1.2 | 0.0 | 0 |
| Example 4 | Developer set 4 | 1.2 | 0.0 | 4 |
| Example 5 | Developer set 5 | 1.0 | 0.0 | 0 |
| Example 6 | Developer set 6 | 0.9 | 0.0 | 7 |
| Example 7 | Developer set 7 | 0.8 | 0.0 | 8 |
| Example 8 | Developer set 8 | 1.0 | 0.0 | 0 |
| Example 9 | Developer set 9 | 1.1 | 0.0 | 0 |
| Example 10 | Developer set 10 | 1.2 | 0.0 | 4 |
| Example 11 | Developer set 11 | 1.2 | 0.7 | 4 |
| Example 12 | Developer set 12 | 1.2 | 0.1 | 4 |
| Example 13 | Developer set 13 | 1.2 | 0.2 | 4 |
| Example 14 | Developer set 14 | 1.2 | 0.4 | 4 |
| Example 15 | Developer set 15 | 1.2 | 0.7 | 0 |

TABLE 7-continued

| | | Adhesive strength Stress ($N/cm^2$) | Print transfer Print transfer density (%) | Durability Number of streaks (streaks) |
|---|---|---|---|---|
| Example 16 | Developer set 16 | 1.2 | 0.4 | 0 |
| Example 17 | Developer set 17 | 1.2 | 0.4 | 1 |
| Example 18 | Developer set 18 | 1.1 | 0.0 | 0 |
| Example 19 | Developer set 19 | 1.3 | 0.0 | 3 |
| Example 20 | Developer set 20 | 1.2 | 0.5 | 0 |
| Example 21 | Developer set 21 | 1.0 | 0.0 | 0 |
| Example 22 | Developer set 22 | 0.7 | 0.0 | 10 |
| Comparative example 1 | Developer set 23 | 0.5 | 0.0 | 0 |
| Comparative example 2 | Developer set 24 | 0.5 | 0.0 | 11 |
| Comparative example 3 | Developer set 25 | 1.2 | 1.2 | 0 |
| Comparative example 4 | Developer set 26 | 0.5 | 0.0 | 0 |
| Comparative example 5 | Developer set 27 | 0.4 | 0.0 | 6 |
| Comparative example 6 | Developer set 28 | 0.2 | 0.0 | 12 |
| Comparative example 7 | Developer set 29 | 0.2 | 0.0 | 15 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-130345, filed Jul. 31, 2020, which is hereby incorporated by reference herein in its entirety.

What is claimed is:

1. An electrophotographic developer set comprising a toner comprising a thermoplastic resin and a wax; and a powder adhesive comprising a thermoplastic resin and a wax, wherein where Ea (mmol/g) denotes an ester group concentration of the wax contained in the toner, Na (mass %) denotes a content of the wax in the toner, Eb (mmol/g) denotes an ester group concentration of the wax contained in the powder adhesive, and Nb (mass %) denotes a content of the wax in the powder adhesive, the Ea, the Na, the Eb and the Nb satisfy formulae:

$$0.00 \le Ea \le 2.45,$$

$$2.50 \le Eb \le 3.60, \text{ and}$$

$$0.80 \le Nb/Na.$$

2. The electrophotographic developer set according to claim 1, wherein the Ea and the Eb satisfy:

$$0.50 \le Eb-Ea \le 3.40.$$

3. The electrophotographic developer set according to claim 1, wherein the wax in the powder adhesive comprises at least one selected from the group consisting of an ester wax represented by formula (1) and an ester wax represented by formula (2):

(1)

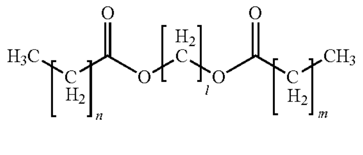

-continued (2)

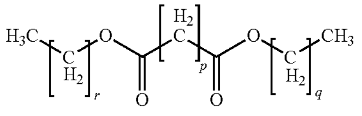

where:

in the formula (1), l represents a positive integer from 2 to 12, and n and m each independently represents a positive integer from 12 to 20; and in the formula (2), p represents a positive integer from 2 to 10, and q and r each independently represents a positive integer from 11 to 21.

4. The electrophotographic developer set according to claim 3, wherein the wax in the powder adhesive comprises the ester wax represented by the formula (1), and in the formula (1), l represents 2, and n and m each independently represents a positive integer of 14 to 20.

5. The electrophotographic developer set according to claim 3, wherein a content Nb1 of the ester wax in the powder adhesive is 8.0 to 20.0 mass %.

6. The electrophotographic developer set according to claim 3, wherein the wax in the powder adhesive further comprises a chain saturated hydrocarbon having a peak carbon number from 20 to 70.

7. The electrophotographic developer set according to claim 1, wherein the content Nb of the wax in the powder adhesive is 8.0 to 20.0 mass %.

8. The electrophotographic developer set according to claim 1, wherein a content of the wax in the toner is 2.0 to 15.0 mass %.

9. The electrophotographic developer set according to claim 1, wherein the wax in the toner comprises an ester compound of a monoalcohol having 18 to 24 carbon atoms and a monocarboxylic acid having 18 to 24 carbon atoms.

10. The electrophotographic developer set according to claim 1, wherein the thermoplastic resin in the toner and the powder adhesive comprises at least one selected from the group consisting of a polyester resin and a styrene-acrylic resin.

11. A method for producing a bonded product resulting from bonding at least one sheet of paper via an adhesive portion by using an electrophotographic developer set, wherein:

the electrophotographic developer set comprises:

a toner comprising a thermoplastic resin and a wax; and a powder adhesive comprising a thermoplastic resin and a wax, where Ea (mmol/g) denotes an ester group concentration of the wax contained in the toner, Na (mass %) denotes a content of the wax in the toner, Eb (mmol/g) denotes an ester group concentration of the wax contained in the powder adhesive, and Nb (mass %) denotes a content of the wax in the powder adhesive, the Ea, the Na, the Eb and the Nb satisfy formulae:

$$0.00 \leq Ea \leq 2.45,$$

$$2.50 \leq Eb \leq 3.60, \text{ and}$$

$$0.80 \leq Nb/Na,$$

wherein:

the bonded product has a surface A on which an adhesive portion of the powder adhesive is fixed, and a toner image portion of the toner is fixed, wherein the method comprises steps (A) and (B):

(A) forming the toner image portion and the adhesive portion on at least one surface of the surface A, and fixing the toner image portion and the adhesive portion by heating; and (B) forming the adhesive portion on one surface of the surface A and fixing the adhesive portion by heating, and forming the toner image portion on at least the other surface of the surface A and fixing the toner image portion by heating, and wherein:

the method further comprises, after the forming and the fixing of the toner image portion and the adhesive portion, steps of:

overlaying the paper so as to interpose the adhesive portion; and melting the adhesive portion thereby bonding the paper to obtain the bonded product.

12. A powder adhesive comprising:

a thermoplastic resin;

a compound represented by formula (1):

(1)

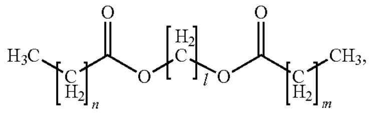

where, in the formula (1), l represents 2, and n and m each independently represents a positive integer of 14 to 20; and a chain saturated hydrocarbon having a peak carbon number of 20 to 70, wherein:

the thermoplastic resin is a styrene-acrylic resin;

a content of the thermoplastic resin in the powder adhesive is 75.0 to 92.0 mass %;

a content Nb1 of the compound represented by the formula (1) in the powder adhesive is 8.0 to 20.0 mass %;

a content Nb2 of the chain saturated hydrocarbon having a peak carbon number of 20 to 70 in the powder adhesive is 0.1 to 5.0 mass %; and the Nb1 and the Nb2 satisfy:

$$2.00 \leq Nb1/Nb2 \leq 25.00$$

(1)

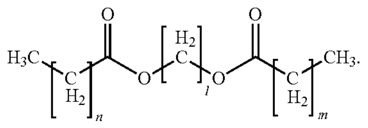

* * * * *